(12) United States Patent
Johnson et al.

(10) Patent No.: US 11,116,344 B2
(45) Date of Patent: *Sep. 14, 2021

(54) THERAPY PLATFORM MULTI-LAYER ANTI-FATIGUE MATTING

(71) Applicant: JOHNSON TECHNOLOGIES CORPORATION, Nashville, TN (US)

(72) Inventors: Paul R. Johnson, Franklin, TN (US); Robert E. Johnson, Hendersonville, TN (US)

(73) Assignee: Johnson Technologies Corporation, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/736,790

(22) Filed: Jan. 7, 2020

(65) Prior Publication Data

US 2020/0315385 A1   Oct. 8, 2020

Related U.S. Application Data

(63) Continuation-in-part of application No. 15/646,273, filed on Jul. 11, 2017, now Pat. No. 10,524,602.

(51) Int. Cl.
*A47L 23/24* (2006.01)
*A47G 27/02* (2006.01)
(Continued)

(52) U.S. Cl.
CPC ............ *A47G 27/0231* (2013.01); *B32B 1/00* (2013.01); *B32B 3/06* (2013.01); *B32B 5/18* (2013.01); *B32B 7/12* (2013.01); *B32B 21/08* (2013.01); *A63C 19/00* (2013.01); *B32B 2266/08* (2013.01); *B32B 2471/04* (2013.01); *Y10T 428/192* (2015.01)

(58) Field of Classification Search
CPC .... Y10T 428/192; A47L 23/24; E04F 19/061; A47G 27/0231
See application file for complete search history.

(56) References Cited

U.S. PATENT DOCUMENTS 2,721,818 A   10/1955   Dolnick et al.
2,810,671 A   10/1957   Taylor
(Continued)

*Primary Examiner* — Alexander S Thomas
(74) *Attorney, Agent, or Firm* — Carrithers Law Office PLLC; David W. Carrithers

(57) ABSTRACT

An ergonomic modular ergonomic multi-layer platform with a synthetic tapered marginal border including a non-compressible wood base covered with at least one compressible mat disposed between the wood base and a top non-slip mat to provide occupational workers with a therapeutic, forgiving work surface to protect them from the health risks of working, walking and standing on a concrete floor or common anti-fatigue mat used in many factories today. The therapy platform is raised off the floor to offer suspension, thus promoting a spring effect for absorbing and returning compression force resulting in reduced stress loads and compression force for people who work, walk or stand fort extended periods of time. The therapy platform is modular in design so that the tapered borders of separate modular sections connect for a snug fit. The vertical edges of the wood sections also have connection points that provide a leveling effect and further enhance the fit of the module sections.

47 Claims, 16 Drawing Sheets

(51) Int. Cl.
*B32B 21/08* (2006.01)
*B32B 1/00* (2006.01)
*B32B 5/18* (2006.01)
*B32B 3/06* (2006.01)
*B32B 7/12* (2006.01)
*A63C 19/00* (2006.01)

(56) References Cited

U.S. PATENT DOCUMENTS

| | | |
|---|---|---|
| 3,234,577 A | 2/1966 | Mann |
| 4,564,546 A | 1/1986 | Jones |
| 5,848,830 A | 12/1998 | Castle et al. |
| 6,128,881 A | 10/2000 | Blue |
| 6,250,001 B1 | 6/2001 | Gillespie |
| 6,589,631 B1 | 7/2003 | Suzuki et al. |
| 7,993,726 B2 | 8/2011 | Johnson et al. |
| 9,700,165 B2 | 7/2017 | Johnson et al. |
| 10,524,602 B2 * | 1/2020 | Johnson ............. A47G 27/0231 |
| 2002/0114926 A1 | 8/2002 | Malpass et al. |
| 2004/0261209 A1 | 12/2004 | McKay |
| 2006/0010804 A1 | 1/2006 | Gray |

* cited by examiner

THERAPY PLATFORM MULTI-LAYER ANTI-FATIGUE MATTING

CROSS REFERENCES TO RELATED APPLICATIONS

This application is a Continuation In Part of U.S. Pat. No. 10,524,602 which issued on Jan. 7, 2020 from U.S. application Ser. No. 15/646,273 filed on Jul. 11, 2017 which is incorporated by reference herein in its entirety.

TECHNICAL FIELD

The present invention relates to the field of ergonomic and safety anti-fatigue matting.

BACKGROUND OF THE INVENTION

Work-related musculoskeletal disorders (MSD) result when there is a mismatch between the physical capacity of workers and the demands of the job. Musculoskeletal disorders are the leading cause of disability of people in their working years, afflicting over 19 million workers. One-half of the nation's work force is affected at some time during their working lives. Statistics show a steady increase in musculoskeletal disorders. Each year thousands of workers in the United States report work related MSDs such as tendonitis, epicondylitis, carpal tunnel syndrome, and back injuries. Many of these are caused or aggravated by work related stressors such as lifting, reaching, pulling, pushing, and bending.

About one-third of all occupational injuries and illnesses stem from over exertion and/or repetitive motion. Cost to the nation in direct work's comp costs exceed $20 billion. Several high profile studies have been conducted over the last few years by respected scientists from the National Academy of Sciences (NAS), the National Institute for Occupational Safety and Health (NIOSH), and others.

Ergonomics is the applied science of equipment design for the workplace, intended to maximize productivity by reducing operator fatigue and discomfort.

According to occupational therapy doctors a person standing, walking and working on hard surfaces such as concrete for prolonged periods of time may develop significant cumulative trauma or other injury, such as musculo-skeletal illness, pain, fatigue and inhibited circulation. Both load bearing stress and the gait cycle i.e. walking on concrete requires compressive force and stress loads on a body's muscles, joints and tendons which overtime wear out causing pain, discomfort and often times requiring painful surgery. In these conditions the musculo-skeletal structure is basically the body's internal shock absorption system. Unfortunately, heel spurs and plantar fasciitis are common problems as they are a direct interface to the concrete and the first point of shock absorption. Other systemic injuries include the knees, pelvic, lower back and vascular related problems. The pain, fatigue and general discomfort can result in tendinitis, arthritis as well as reduced worker productivity, higher turnover and diminished quality and moral.

In an attempt to alleviate such occupational hazards, employers often place cushioned matting on floors proximate employee workstations. Unfortunately, as employees walk, twist and turn on these mats they sprain, strain and tear soft tissue and other related musculo-skeletal matter in their body's due to their foot sticking while being compressed into the mat. These types of injuries are analogous to downhill skiing injuries in that they more frequently occur when more fatigue is present in the workers typically later in their shift. Due to the frequency and costs of these types of injuries, major companies are restricting the use of matting to limited static jobs only where no walking, twisting and turning is required. Also, bunching and curling of matting create tripping hazards in many settings, including occupational environments. Such hazards are a top recordable complaint in occupational settings. In some cases, the matting is taped, glued and screwed to the floor making that matting a permanent one time use product. Other mats are fastened to the floor via bolts or screws. However the bolts and screws can be the cause of tripping hazards for personnel.

Wood floors are commonly used on basketball and volleyball courts as well as for other sports as a preferred alternative to concrete because of wood's softer, more therapeutic and forgiving composition. Therefore wood floors help reduce injuries in these high impact activities and are now the standard best practice for collegiate and professional sports. Some wood floors are also constructed to maximize a spring type effect utilizing some methods of suspension to further compression absorption and reduce stress. Many factories were made with wood floor during the industrial revolution for these same reasons when they were built on multiple levels. The modern industrial complex of today is generally one level with a floor consisting of concrete. While efficient and cost effective from a construction standpoint, concrete is not very ergonomic in nature as a work floor surface. Due to the non-compressible nature of concrete, a workers joints, tendons and muscles absorb all of the impact due to walking, jumping or any other movements on the floor. Cumulative job activities performed on concrete can and potentially will lead to a multitude of back and lower extremity injuries.

Applicants U.S. Pat. No. 7,993,726 for a "MATTING PRODUCT" teaches a work mat including a top semi-rigid non-slip surface attached to a lower elastomeric layer of a selected compressibility. The outer marginal area of the combined layers tapers to the floor to reduce the trip hazard. A rigid metal rim is fastened between the two layers near the top of the taper to prevent rolling of the edges of the mat. U.S. Pat. No. 7,993,726 is hereby incorporated by reference in its entirety.

SUMMARY OF THE INVENTION

The present invention comprises a work mat which incorporates a modular ergonomic work platform raised slightly above a support surface such as a floor providing cushioning and resilience for users thereof. The work mat provides workers a therapeutic, flexing and cushioning work surface to protect them from the aforementioned health risks of working, walking and standing on a concrete floor. The flexing anti-fatigue platform or mat is usable in a modular form whereby sections can be joined together to build platforms. This ergonomic work platform is raised off the floor to provide suspension thus promoting a spring effect for absorbing and returning compression forces resulting in reduced stress loads. The compression force provides an anti-fatigue mat usable in modular form to build platforms for people as an alternative to walking or standing on concrete floors. This product is constructed with a modular design having tapered peripheral borders connecting together and to the raised ergonomic work platform providing a seamless transition for a snug gap-free fit. The vertical plane or edge of the platform has a thickness providing connection points that provide a leveling effect and further enhance the fit of said modules.

None of the prior art references teach or suggest a mat comprising a chamfered edge having a longitudinal member with a flat base connecting to an end wall and a top load support surface integrally joining the base and the end wall at an acute angle forming an inclined plane extending upward from a tip formed by a junction with the base and the top or the end wall and providing a generally seamless transition from the edge border to a top surface of a platform section and the base of the border extending pass the end wall forming a border base flange whereby the end wall of the edge border abuts a side edge of the platform and the border base flange supports a bottom edge of the platform.

One preferred work mat ergonomic work platform surface comprises a bottom base layer of wood; however, wood composites, rubber or polymer compounds, wood flooring covered by a coating such as a polyurethane or a nonslip substance such as a rubber or a poly vinyl chloride "PVC" or an ESD material, a recycled plastics containing rubber or a soft plastic material, a fiber glass, an aluminum, a synthetic material or a plastic material can comprise the ergonomic work platform surface. One preferred embodiment includes a non-compressible wood base bottom layer covered by a synthetic mat middle layer having compression deflection or resistance typically less than 10 pounds per square inch comprises a surface including raised pattern such as a diamond plate pattern comprising a plurality of knots, bumps, ridges, dimples or other raised patterns having spaces therebetween; or a mat including recessed areas comprising grooves, pits, inverted dimples or other recessed areas. A top portion of the therapy platform comprising a slip resistance synthetic material such as rubber, neoprene, vinyl chloride material, styrene butadiene rubber ("SBR"), and nonslip compositions containing same covers the middle limited compression layer. For purposes of describing the ergonomic work platform surface, the term "multi-layer platform" shall be used to define the work platform surface, it being understood that other materials can be substituted therefor.

In accordance with the present invention, there is provided a modular ergonomic safety work mat comprising, consisting of, or consisting essentially of at least one and preferably two mating work mat sections. A female work mat section, a male work mat section and any desired number of expander work mat sections can be assembled together providing a work platform.

The present invention is described as a rectangular shape; however, alternate shapes for the floor or platform may include square, triangular, angled, circular, elliptical, triangular, and is not limited to any particular geometric shape.

For example, the female work mat section contains a first rectangular or square multi-layer platform bounded by a first border on three sides. The first rectangular multi-layer platform has a top surface, a bottom surface, two long sides and two short sides. The first border surrounds the first rectangular multi-layer section on a first one of the long sides and on the two short sides. The first border has a generally right triangular cross-section wherein a long side of the right triangle rests on the floor. The hypotenuse of the right triangle extends from about the top edge of the first rectangular multi-layer platform down to the floor, and a short side of the right triangle extends from a top edge of the first rectangular multi-layer platform down to the floor with an outer surface of the short side of the right triangle adjacent to an outer surface of a first one of the long sides and the two short sides of the first rectangular multi-layer platform. The first border includes two spaced apart web elements which are parallel to the short side of the right triangle. The first of the web elements is spaced apart from the short side of the right triangle and thereby forms a first aperture sized to accept a connecting means such as a first square wooden dowel of a first size. The second of the web elements is spaced apart from the first web element and thereby forms a second aperture to accept a second wooden dowel of a second size. The first border has a first horizontal web member extending from the intersection of the short side and the long side inward under an outer edge of the first one of the long sides and on the two short sides of the multi-layer platform thereby elevating the first rectangular multi-layer platform above a top surface of the floor. The second of the two long sides of the first rectangular multi-layer platform has a plurality of spaced apart horizontal biscuit slots formed therein.

The male work mat section contains a second rectangular multi-layer platform bounded by a second border on three sides. The second multi-layer platform has a top surface, a bottom surface, two long sides and two short sides. The second border surrounds the second rectangular multi-layer section on a first one of the long sides and on the two short sides. The second border has a generally right triangular cross-section wherein a long side of the right triangle rests on the floor. The hypotenuse of the right triangle extends from about a top edge of the second rectangular multi-layer platform down to the floor, and the short side of the right triangle extends from a top edge of the second rectangular multi-layer platform down to the floor with an outer surface of the short side of the right triangle adjacent to an outer surface of a first one of the long sides and the two short sides of the second rectangular multi-layer platform. The second border includes two spaced apart web elements. The web elements are parallel to the short side of the right triangle. The first of the web elements is spaced apart from the short side of the right triangle and thereby forms a first aperture sized to accept a first square wooden dowel of a first size. A first square wooden dowel extends outward from the first aperture. The second of the web elements is spaced apart from the first web element and thereby forms a second aperture to accept a second wooden dowel of a second size. A second square wooden dowel extends outward from the second aperture. The second border has a second horizontal web member extending from an intersection of the short side and the long side inward under an outer edge of the first one of the long sides and on the two short sides of the multi-layer platform thereby elevating the second rectangular multi-layer platform above a top surface of the floor. The second of the two long sides of the second rectangular multi-layer platform has a plurality of spaced apart horizontal biscuits extending therefrom. The biscuits are spaced apart to match the spacing of the biscuit slots of the first rectangular multi-layer platform.

An expander work mat section contains a third rectangular multi-layer platform bounded by a third border on a first short side and a fourth border on a second short side. The third multi-layer platform has a top surface, a bottom surface, two long sides and two short sides. The third and the fourth borders have a generally right triangular cross-section wherein a long side of the right triangle rests on a floor, a hypotenuse of the right triangle extends from about a top edge of the third rectangular multi-layer platform down to the floor, and a short side of the right triangle extends from a top edge of the third rectangular multi-layer platform down to the floor with an outer surface of the short side of the right triangle adjacent to an outer surface of the two short sides of the third rectangular multi-layer platform. The third and the fourth borders include two spaced apart web elements. The web elements are parallel to the short side of the right triangle. The first of the web elements is spaced apart from the short side of the right triangle and thereby forms a first aperture sized to accept a first square wooden dowel of a first size. The second of the web elements is spaced apart from the first web element and thereby forms a second aperture to accept a second wooden dowel of a second size. The third and fourth borders have third and fourth respective horizontal web members extending from an intersection of the short side and the long side inward under an outer edge of the two short sides of the third multi-layer platform thereby elevating the first rectangular multi-layer platform above a top surface of the floor. The first of the two long sides of the third multi-layer platform has a plurality of spaced apart biscuit slots formed therein and spaced apart to match the spacing of the biscuits in the male work mat section. The second of the two long sides of the third rectangular multi-layer platform has spaced apart biscuits extending outward therefrom. The biscuits are spaced apart to match the spacing of the biscuit slots in the female work mat section. The third and fourth borders have square dowels extending therefrom on border ends adjacent to the second of the two long sides of the third rectangular multi-layer platform. The long sides of the first, second and third multi-layer platforms are equal in length and thickness.

The ergonomic safety work mat includes a modular ergonomic platform with a synthetic tapered marginal border. The modular ergonomic work mat is designed to support a worker standing thereon while operating a machine for comfort and for the purpose of easing of physical stress caused by standing on a non-compressible concrete floor during a work day. The work mat includes a multi-layer platform with a peripheral webbed synthetic border extending from the work mat surface to the floor that is chamfered so that the border tapers to the floor. In addition, the synthetic border includes a base which extends inward a selected distance under the peripheral edge of the multi-layer platform, thereby elevating the multi-layer platform above the floor. The multi-layer platform is suspended over the floor and can flex up and down slightly as a user walks on or stands on the mat, thereby absorbing some of the shock of walking and moving on the mat. The compressibility of the multi-layer platform adds to the comfort of the work mat as well. A plurality of platform sections with mats can be joined together with connection means such as a tongue and groove arrangement joining the sections.

The work mat is modular and generally includes a female work mat section, a male work mat section and any number of expander sections which, when assembled form, a rectangular work mat of any given length. The expander sections may have a skewed shape which will then provide a long work mat which is not necessarily straight but contains angles or contours so that the overall work mat follows the contours of any given workstation.

One modular mat platform comprises or consists of at least one female work mat section comprising a first rectangular platform having a top surface, a bottom surface, and at least one female inner edge. At least one male work mat section comprises a first rectangular platform having a top surface, a bottom surface, and at least one male inner edge. The at least one female work mat includes a first female side edge border parallel and spaced apart from a second female side edge border connected by a female end edge border, each one having a chaffered edge including at least one conduit extending along a longitudinal side edge comprising spaced apart web elements. The at least one male work mat includes a first male side edge border parallel and spaced apart from a second male side edge border connected by a male end edge border, each one having a chaffered edge including at least one conduit extending along a longitudinal side edge comprising spaced apart web elements. The at least one female work mat aligns opposite the at least one male work mat with the at least one female inner edge opposing the at least one male inner edge. At least one connecting dowel of corresponding size and shape is disposed in the first female side edge conduit and the corresponding first male side edge conduit, and at least one connecting dowel of corresponding size and shape is disposed in the second female side edge conduit and the corresponding male second side edge conduit for cooperative engagement of the at least one female inner edge and the at least one male inner edge. The chaffered edge of the edge border comprises a longitudinal member having a flat base connecting to an end wall, and a top load supporting surface integrally joining the base and the an end wall at an acute angle forming an inclined plane extending upward from a tip formed by a junction with the base and the top or the end wall providing a generally seamless transition from the edge border to a top surface of the platform section. The web comprises at least two spaced apart vertical walls spaced apart from the end wall for providing compression and lateral support. The edge border includes longitudinal border support members inserting into a longitudinal passage between the spaced apart vertical walls of the edge border to provide structural strength thereto and minimize compression under load. The base extends pass the end wall forming a border base flange, whereby the end wall of the edge border abuts a side edge of the platform and the border base flange supports a bottom edge of the platform above a top surface of the floor.

More particularly, the present invention comprises or consists of a modular mat platform comprising at least one female work mat section comprising a first rectangular multi-layer platform having a top surface, a bottom surface, and at least one female inner edge; at least one male work mat section comprising a first rectangular multi-layer platform having a top surface, a bottom surface, and at least one male inner edge; the at least one female work mat including a first female side edge border parallel and spaced apart from a second female side edge border connected by a female end edge border, each one having a chamfered edge including at least one conduit extending along a longitudinal side edge comprising spaced apart web elements; the at least one male work mat including a first male side edge border parallel and spaced apart from a second male side edge border connected by a male end edge border, each one having a chamfered edge including at least one conduit extending along a longitudinal side edge comprising spaced apart web elements; the at least one female work mat aligning opposite the at least one male work mat with the at least one female inner edge opposing the at least one male inner edge; and at least one connecting dowel of corresponding size and shape disposed in the first female side edge conduit and the corresponding first male side edge conduit, and at least one connecting dowel of corresponding size and shape disposed in the second female side edge conduit and the corresponding male second side edge conduit for cooperative engagement of the at least one female inner edge and the at least one male inner edge.

The work mat platform may including a selected number of expander work mat sections each one comprising or consisting of at least one expander work mat section comprising a first rectangular multi-layer platform having a top surface, a bottom surface, and an expander female inner edge and an expander male inner edge; the at least one expander work mat including a first expander side edge border parallel spaced apart from a second expander side edge border, each one having a chamfered edge including at least one conduit extending along a longitudinal side edge comprising spaced apart web elements; the at least one expander work mat including a first expander side edge border parallel and spaced apart from a second expander side edge border connected by an expander end edge border, each one having a chamfered edge including at least one conduit extending along a longitudinal side edge comprising spaced apart web elements; the expander female inner edge aligning opposite of the inner edge of the at least one male work mat and the expander male inner edge aligning opposite of the inner edge of at least one female inner edge; and at least one connecting dowel of corresponding size and shape disposed in the first female side edge conduit and the corresponding first expander side edge conduit, and at least one connecting dowel of corresponding size and shape disposed in the male side edge conduit and the corresponding expander second side edge conduit for cooperative engagement of the at least one female work mat with the expander work mat and the at least one male work mat.

The modular platform mat comprises at least one female work platform mat section comprising a first rectangular multi-layer platform having a top surface, a bottom surface, and at least one female inner edge. At least one male work platform mat section comprises a first rectangular multi-layer platform having a top surface, a bottom surface, and at least one male inner edge. The at least one female work platform mat includes a first female side edge border parallel and spaced apart from a second female side edge border connected by a female end edge border, each one having a chamfered edge including at least one conduit extending along a longitudinal side edge comprising spaced apart web elements. The at least one male work platform mat includes a first male side edge border parallel and spaced apart from a second male side edge border connected by a male end edge border, each one having a chamfered edge including at least one conduit extending along a longitudinal side edge comprising spaced apart web elements. The at least one female work platform mat aligns opposite the at least one male work platform mat with the at least one female inner edge opposing the at least one male inner edge. At least one connecting dowel of corresponding size and shape is disposed in the first female side edge conduit and the corresponding first male side edge conduit, and at least one connecting dowel of corresponding size and shape disposed in the second female side edge conduit and the corresponding male second side edge conduit for cooperative engagement of the at least one female inner edge and the at least one male inner edge. A base of the border extends pass an end wall forming a border base flange, whereby the end wall of the edge border abuts a side edge of the platform and the border base flange supports a bottom edge of the platform. The chamfered edge of the edge border comprises a longitudinal member having a flat base connecting to an end wall, and a top load supporting surface integrally joining the base and the an end wall at an acute angle forming an inclined plane extending upward from a tip formed by a junction with the base and the top or the end wall providing a generally seamless transition from the edge border to a top surface of the platform section.

More particularly, the modular platform mat includes a selected number of expander work platform mat sections. Each platform mat sections comprises at least one expander work platform mat section comprising a first rectangular multi-layer platform having a top surface, a bottom surface, and an expander female inner edge and an expander male inner edge. At least one expander work platform mat includes a first expander side edge border parallel spaced apart from a second expander side edge border, each one having a chamfered edge including at least one conduit extending along a longitudinal side edge comprising spaced apart web elements. The at least one expander work platform mat includes a first expander side edge border parallel and spaced apart from a second expander side edge border connected by an expander end edge border, each one having a chamfered edge including at least one conduit extending along a longitudinal side edge comprising spaced apart web elements. The expander female inner edge aligns opposite of the inner edge of the at least one male work platform mat and the expander male inner edge aligns opposite of the inner edge of at least one female inner edge. At least one connecting dowel of corresponding size and shape is disposed in the first female side edge conduit and the corresponding first expander side edge conduit, and at least one connecting dowel of corresponding size and shape is disposed in the male side edge conduit and the corresponding expander second side edge conduit for cooperative engagement of the at least one female work platform mat with the expander work platform mat and the at least one male work platform mat. The chamfered edge of the edge border comprises a longitudinal member having a flat base connecting to an end wall, and a top load supporting surface integrally joining the base and the an end wall at an acute angle forming an inclined plane extending upward from a tip formed by a junction with the base and the top or the end wall providing a generally seamless transition from the edge border to a top surface of the platform section. The web comprises at least two spaced apart vertical walls spaced apart from the end wall for providing compression and lateral support. The base of the border extends pass the end wall forming a border base flange, whereby the end wall of the edge border abuts a side edge of the platform and the border base flange supports a bottom edge of the platform. A longitudinal border support member is inserted into a longitudinal passage between the spaced apart vertical walls of the edge border to provide structural strength thereto and minimize compression under load.

An object of this invention is to provide a therapeutic flooring alternative to concrete or anti-fatigue matting that will aid in absorbing stress loads of employees body's helping to mitigate the cumulative trauma effects and associated lower extremity injuries related to working, walking and standing on concrete.

Another object of this invention is to provide a modular work platform as seamless and transitional as possible by having a modular tapered connecting border system that raises and supports the work platform from the floor without any edges representing trip hazards.

Another object of this invention to provide a work mat which is modular in that end sections and extender sections of the work mat are assembled together to provide a long work mat of any desired length, wherein the border includes horizontal longitudinal sockets into which dowels may be inserted to align and hold end sections and extender sections together in a tongue and groove arrangement, and wherein multi-layer platform edges of the end sections and extender sections include 'biscuits' or dowels to help hold the sections together. The sections held together by friction fit or may be glued together.

Another object of this invention is to provide a suspended, yet low profile work platform which incorporates a multi-functional tapered border system that connects the modular sections, offers a vertical rise, provides a horizontal and vertical mounting surface, and provides a non skid bottom surface.

Another object of this invention is to provide a combination of functional connection points in the tapered border and attached wood for adjoining multiple configurations and sizes of work platform.

Another object of this invention is to combine a wood surface with a tapered safety edge and a non skid bottom surface that does not interfere with a consistent outer slope from the highest vertical point to the bottom of the floor.

Another object of this invention is to provide an internal means of connection with a hollowed border enabling a male-female connection point therefore eliminating an external connection point and potential trip point.

Another object of this invention is to provide a means of multiple internal connection points utilizing the tapered border system in combination with a wood connection method such as biscuit joining of adjacent multi-layer modular sections.

Another object of this invention is to provide multiple types of top surfaces for the ergonomic work platform which include various traction configurations, patterns, grit and ESD (electro static dissipative) for use in clean rooms.

It is another object of the present invention to include interlocking grit deck wet area matting, diamond plat top matting, anti-fatigue matting, and/or electro static discharge matting.

Another object of this invention is to provide a stress reducing safety work mat which includes a multi-layer platform surrounded and supported by a synthetic border which tapers down to the floor to reduce the trip hazard caused by the thickness of the mat.

Another object of this invention is to provide a work mat wherein the synthetic border extends under the outer marginal edge of the multi-layer platform and thereby suspends the platform above the floor by a selected distance, thus providing room for the multi-layer platform to flex under the load of a user standing or walking on the platform.

Another object of this invention is to provide a work mat wherein the compressibility of the wood in the multi-layer platform further enhances the comfort of the user.

Another object of this invention is to provide a work mat wherein the multi-layer platform consists of plywood flooring which is covered with a non-slip coating to protect the user and the wood.

An object of this invention is to offer a therapeutic flooring alternative to concrete and anti-fatigue matting that will aid in absorbing stress loads of employees body's helping to mitigate the cumulative trauma effects and associated lower extremity injuries related to working, walking and standing on concrete.

Another object of this invention is to make this module work platform as seamless and transitional as possible by having a modular tapered connecting border system that raises and supports the work platform from the floor with out any gap of outside the slope.

Another object of this invention is to provide a suspended, yet low profile work platform which incorporates a multi functional tapered border system that connects the modules and offers a vertical rise and provides a horizontal and vertical mounting surface and provides a non skid bottom surface.

Another object of this invention is to provide a combination of functional connection points in the tapered border and attached wood for adjoining multiple configuration and sizes of the work platform.

Another object of this invention is to combine a wood surface with a tapered safety edge and a non skid bottom surface that does not interfere with a consistent outer slope from the highest vertical point to the bottom of the floor.

Another object of this invention is to provide and internal means of connection with a hollowed border enabling a male female connection point therefore eliminating an external connection point and potential trip point.

Another object of this invention is to provide a means of multiple internal connection points utilizing the tapered border system in combination with wood connection method.

Another object of this invention is to offer multiple top surfaces to the ergonomic work platform which include various traction configurations, patterns, Grit and ESD (electro static dissipative, clean rooms.

It is an object of the present invention to provide ergonomic work mats used to increase the comfort and endurance of a worker working in a small area such as in front of a machine for an extended period of time.

Another object of this invention is to provide a means of multiple internal connection points utilizing the tapered border system in combination with wood connection method such as a biscuit system or common wood working practices.

Another object of the invention is to offer a work platform that can have a compression able material fastened underneath or above the wood offering further ergonomic properties combined with the function of the platform.

Another object of this invention is to offer an even or flush horizontal work surface where the highest point of the vertical wall edge of the tapered border adjoins the top work surface of a compressible material.

Another object of the present invention is to offer seamless and flush joint with the top of a floor panel or floor section supported by a compressible middle layer.

Another object of the present invention is to provide a layer of compressible material applied to the top of the platform having a compression force deflection according to ASTM D 3574-11 up to 100 psi and preferably from 5 to 75 pounds per square inch.

Another object of the present invention is to provide a compressible material used on the bottom side of the floor platform or section supporting same which provides the floor panel, floor platform or section with a compression force deflection according to ASTM D 3574-11 up to 100 psi and preferably from 5 to 75 psi.

Another object of the present invention is to provide a compressible material on a top surface of the platform, section, or floor panel which would range in compression set under constant deflection according to ASTM D 1056-07 up to 70 psi and preferably from 3-70 psi.

The compressible material on the bottom side ranges in compression set under constant deflection according to ASTM 1056-07 up to 70 psi and preferably from 3-70 psi.

The attached compressible material comprises of an open or closed cell foam material, or vinyl like composite.

It is also contemplated that springs may be utilized to provide some control tension and psi of the work module.

It is another object of the present invention to provide a modular wood platform ranging from ¼" to 1" in thickness with the bottom surface raised off the floor with a range of up to two inches and preferably from ⅛ to 2 inches creating a suspension effect exhibiting a spring bounce and absorption effect for weight bearing stress in static and rhythmic posture.

It is an object of the present invention provides that an optional layer of compressible material covers at least a top surface of the modular mat platform mat.

It is an object of the present invention to provide a modular mat platform whereby a top surface could optionally be covered with a layer or layers of a compressible material ranging from about ¼" to about ¾" of an inch in thickness and more preferably from about ⅛ inch to about ⅝ inch in thickness.

It is an object of the present invention to provide a modular mat platform whereby a top surface could optionally be covered with a layer or layers of a compressible material having a compression force deflection range of about 15%-75% per ASTM D 3574-11.

It is an object of the present invention to provide a modular mat platform whereby a top surface could optionally be covered with a layer or layers of a compressible material having a compression set range of about 3%-50%. Per ASTM D1056-07.

It is an object of the present invention to provide a modular mat platform whereby a top surface could optionally be covered with a layer or layers of a compressible material having a compression force deflection range of about 10 to 100% and more preferably from about 15%-75% per ASTM D 3574-11 and a compression set range of from about 3%-75% per ASTM D1056-07.

It is an object of the present invention to provide a modular mat platform comprising a wood substrate and a combination of sloped nosing or t-molding or L-molding with a top compressible material configuration has a compression force deflection range of about 15%-100% per ASTM D 3574-11.

It is an object of the present invention to provide a modular mat platform comprising a wood substrate and a combination of sloped nosing or t-molding or L-molding with wood and top compression able material configuration with a compression set range of about 3%-50% per ASTM D 1056-07

It is an object of the present invention to provide a modular mat platform comprising a wood substrate and a combination of sloped nosing or T-molding or L-molding with wood and top compressible material configuration with a compression force deflection range of about 15%-100% per ASTM D 3574-11 and a compression able set range of abut 3%-75% per ASTM D1056-07.

It is an object of the present invention to utilize a anti-fatigue slip resistant, abrasion-resistant mat made of chemical resistant vinyl, durable diamond tread plate surface bonded to a buoyant foam base as a middle or top layer of the therapy platform supported by a wood or wood composite substrate to provide safety and ergonomic comfort to workers.

It is an object of the present invention to utilize a therapy platform including a top surface mat a non-slip easy-to-clean flooring surface having an excellent degree of moisture resistance.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
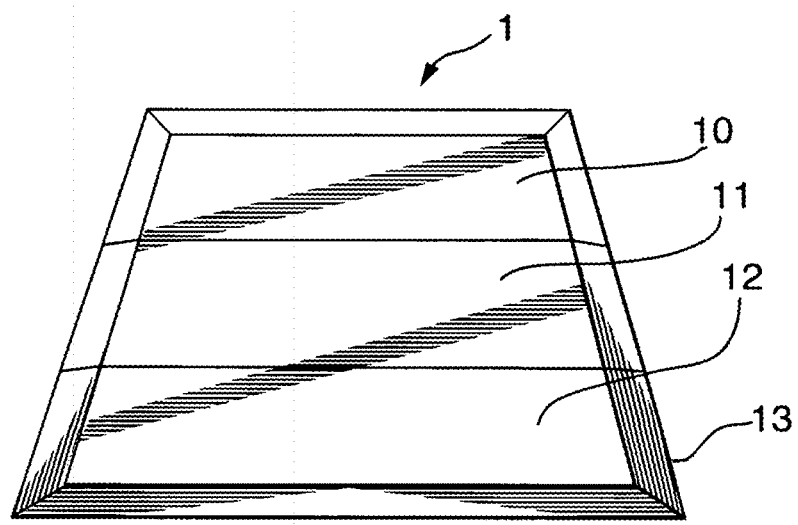
FIG. 1 is a perspective to view of one assembled modular mat including a first end section having inner edges including sockets or grooves, an opposing second end section having inner edges including projections or tongues, and a middle or center section having inner end edges with sockets on one end and projections on an opposing inner end edge for cooperative engagement with the corresponding sockets and projections of the inner end edge of the first section and inner end edge of the second section.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of +10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with the present invention and FIGS. 1-25, a modular ergonomic work platform mat or mat platform 1 is shown in FIG. 1 including a first end section 10 and a second end section 11, and a third center section 12 for extending the length of the working platform mat.

The first end panel or section 10 has a first inner end edge 2 including sockets or pockets for inserts 17 formed therein. The opposing second end section 11 has a second inner end edge 3 including projections, tongues, or biscuit members 16 formed thereon or both sections may include sockets 17 wherein biscuits or other joining members may be inserted into the pockets between adjoining panels locking or joining the panels together. An optional third center section 12 has a third inner end edge 4 including sockets or grooves 17 formed therein, and a fourth inner end edge 5 including projections or tongues 16 formed thereon. It is contemplated that any desired number of middle to center sections 12 can be disposed between a first end section 10 and a second end section 11 to expand the size of the working 1.

The modular wood platform ranges from about ⅛ to 2 inches in thickness with the bottom surface raised off the floor with a more preferable range of about ¼ to 1 inch for suspension effect comprising a spring bounce and absorption effect for weight bearing stress in static and rhythmic posture. The polymer edging raises the wood platform product off of the floor and is incorporated in and around the tapered border and supports joining sections of the platform.

The modular wood platform ranges from about ⅛ to 2 inches in thickness with the bottom surface raised off the floor with a more preferable range of about ¼ to 1 inch for suspension effect comprising a spring bounce and absorption effect for weight bearing stress in static and rhythmic posture. The polymer edging raises the wood platform product off of the floor and is incorporated in and around the tapered border and supports joining sections of the platform.

One preferred work mat ergonomic work platform surface comprises a bottom base layer of wood; however, wood composites, rubber or polymer compounds, wood flooring covered by a coating such as a polyurethane or a nonslip substance such as a rubber or a poly vinyl chloride "PVC" or an ESD material, a recycled plastics containing rubber or a soft plastic material, a fiber glass, an aluminum, a synthetic material or a plastic material can comprise the ergonomic work platform surface. One preferred embodiment includes a non-compressible wood base bottom layer covered by a synthetic mat middle layer having compression deflection or resistance typically less than 10 pounds per square inch comprises a surface including raised pattern such as a diamond plate pattern comprising a plurality of knots, bumps, ridges, dimples or other raised patterns having spaces therebetween; or a mat including recessed areas comprising grooves, pits, inverted dimples or other recessed areas. A top portion of the therapy platform comprising a slip resistance synthetic material such as rubber, neoprene, vinyl chloride material, styrene butadiene rubber ("SBR"), and nonslip compositions containing same covers the middle limited compression layer. For purposes of describing the ergonomic work platform surface, the term "multi-layer platform" shall be used to define the work platform surface, it being understood that other materials can be substituted therefor.

All of the preferred embodiment of the multi-layer platform comprise a wood or wood composite base or substrate as the bottom layer.

The middle layer typically comprises a compressible of deflectable material composed of a synthetic material such as a diamond plate patterned surface formed from PVC, rubber, neoprene, SBR or other rubber containing or elastomeric material. As shown in FIGS. 29-32 the diamond plate patterned surface can be formed on a closed cell PVC sponge base providing durability and comfort often in thicknesses of 15/16 inch, 3/4 inch, 1/2 inch, 1/8 inch or other desired thicknesses.

Figure 34:
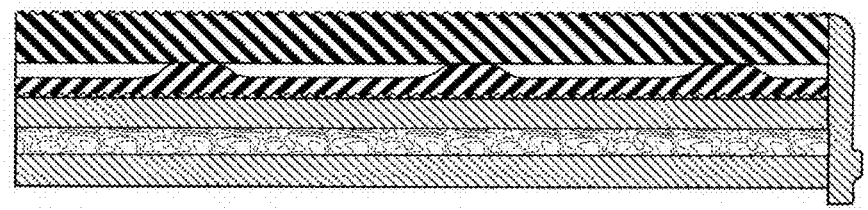
FIG. 34 is a side view of the multi-ply platform showing a wood base, a thin middle layer without sponge cell material having a diamond plate patterned surface supporting a thick closed cell polymer material forming the top layer so that the multi-layer platform is supported above the floor surface.
Figure 35:
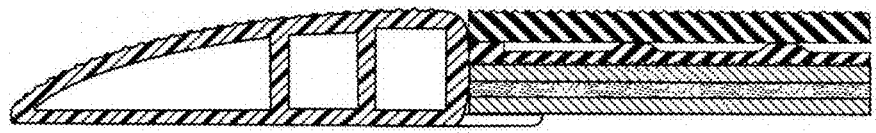
FIG. 35 is a side view of the multi-ply platform showing a wood base, a middle layer without sponge cell material and having a diamond plate patterned surface supporting a closed cell polymer material forming the top layer so that the multi-layer platform is supported above the floor surface affixed to a wedge shaped border.
Figure 36:
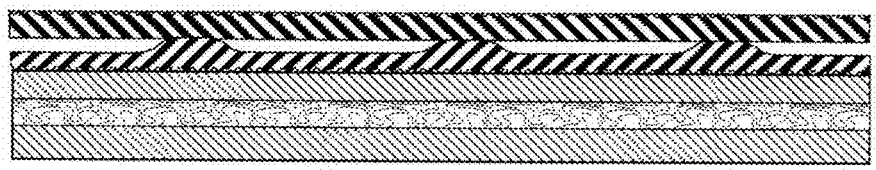
FIG. 36 is a side view of the multi-ply platform showing a bottom wood base substrate, a thin middle layer mat without sponge cell material and having a diamond plate patterned surface supporting a thin rubber or synthetic material forming the top layer.

The top layer typically comprises a compressible or deflectible material composed of a synthetic material having a smooth surface to prevent tripping or resistance to rolling wheels and is formed from PVC, rubber, neoprene, SBR or other rubber containing or elastomeric material. As shown in FIGS. 34-36, the top smooth mat can be placed on top of a mat having a surface containing recesses or a pattern formed from a raised surface. The top mat can be formed on a closed cell PVC sponge base providing durability and comfort often in thicknesses of 15/16 inch, 3/4 inch, 1/2 inch, 1/8 inch or other desired thicknesses. The positioning of a top mat having a smooth surface on top of a middle layer middle mat having recessed or raised surface pattern enables a design of a therapy platform using synthetic materials having a higher compression set value or deflection value together because the texture of the surface of the middle layer as a cushioning layer. The top layer has a greater hardness value to resist deflection and compression as compared to the middle layer.

Figure 33:
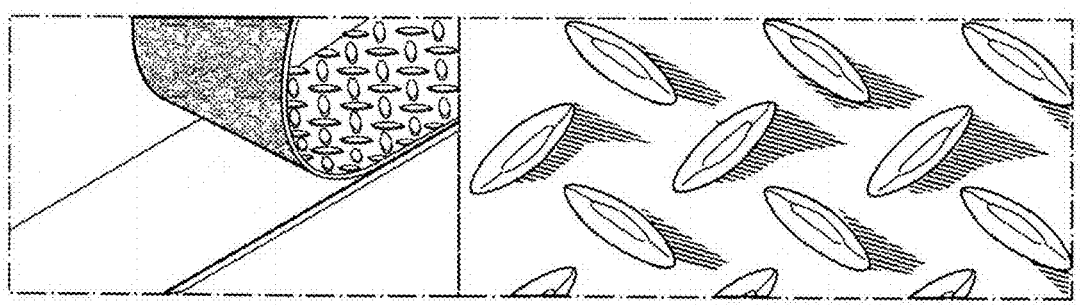
FIG. 33 is a perspective view of a diamond pattern mat having an adhesive covered bottom surface.

The middle synthetic mat layer having a spaced apart pattern forming runners can be installed with a double-sided adhesive, making a quick and easy installation process over the wood base and top smooth surface mat. As shown in FIG. 33, a 3-M pressure sensitive adhesive can be used to bond to the adjacent layer of substrate.

The compressible layer of synthetic material covering the wood base substrate ranges in thickness of from 20 mm to 1 inch, more preferably from about 1/8 inch to 15/16 inches. A middle compressible layer may be the same thickness or a thinner or thicker thickness than the top layer. A compressible layer deflection range for the synthetic mats covering the base is typically between about 15 to 99% and more preferably from about 15 to 75% in accordance with ASTM D 1056-07. In at least one embodiment, it is desired that the top layer covering the mat have a compressible set range between 2 to 75%, and more preferably a compressible set range 3 to 50% in accordance with ASTM D3574-11, and a deflection range of from 15 to 99% in accordance with ASTM D 1056-7. In another embodiment, the combination of sloped nosing or T-molding or I molding with wood as a base and compressible synthetic mats supported thereon has a compression deflection range of from 15 to 99% per ASTM D 1056-07. In another embodiment, the combination of sloped nosing or T-molding or I molding with wood as a base and compressible synthetic mats supported thereon has a compression deflection range of from to 50% per ASTM D 1056-07. In another embodiment, the combination of sloped nosing or T-molding or I molding with wood as a base and compressible synthetic mats supported thereon has a compression deflection range of from 15 to 99% per ASTM D 1056-07 and a compressible set range of from 2 to 75% in accordance with ASTM D3574-11.

The projections 16 of the first inner edge 2 of the first section 10 are cooperatively engageable with the opposing sockets 17 of the second inner end edge 3 of the second end section 12 to form a working platform mat.

As illustrated best in FIGS. 1, 3, 4, and 5, the sockets 17 of the first inner edge 2 of the first section 10 cooperatively engage the opposing projections 16 of the third inner end edge 5 of the third center section 12. The sockets 17 of the third inner end edge 4 of the third center section 12 cooperatively engage the projections 16 of the second inner end edge 3 of the second section 11 to form the work platform mat 1.

Figure 2:
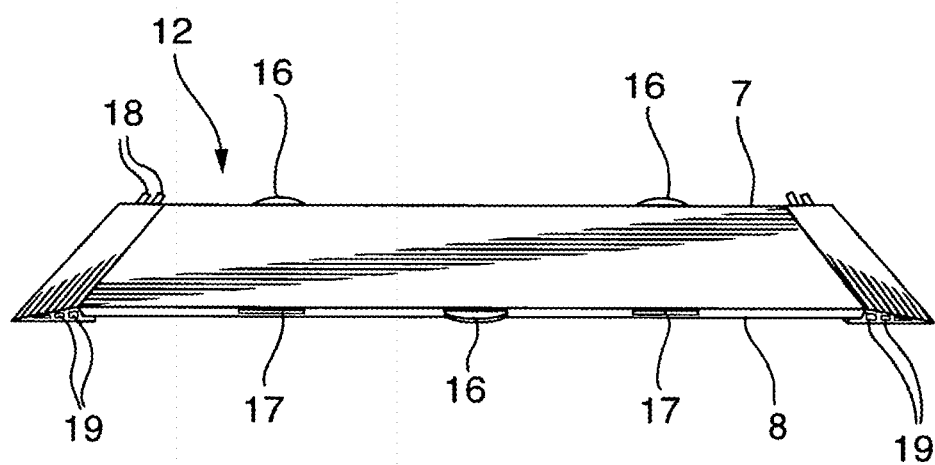
FIG. 2 is a perspective view of a modular mat center section including both projections and sockets in alternate or staggered arrangements on the inner end edges for joining cooperatively engaging a center or end section having corresponding opposing socket and projections.

FIG. 2 shows an extendable middle or center section 11 including alternating sockets 17 and projections 16 on each one of the opposing end edges 7 and 8.

If only a short length of work platform mat is required for a particular installation, then only a female section 10 and a male section 12 will be assembled to one another. When a longer work platform mat is needed, any number of expander sections 11 are added between the female section 10 and the male section 12 to provide the desired length of work platform mat 5. FIG. 1 shows a work platform mat 5 including a female section 10 and a male section 12 with one expander section 11.

Figure 3:
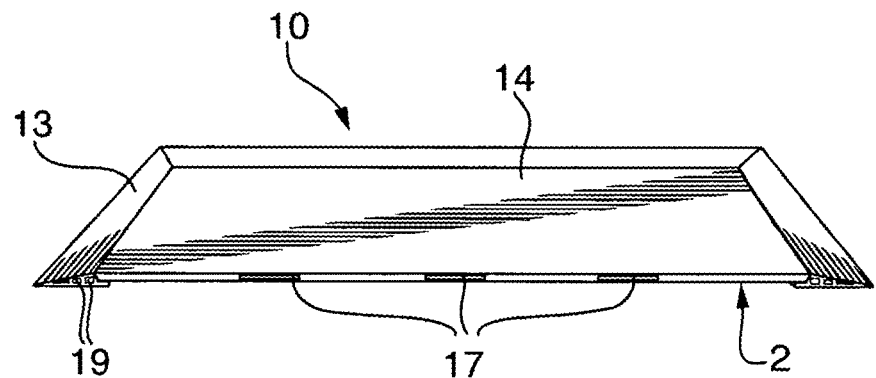
FIG. 3 is a perspective view of an inner end edge including sockets of the first end section of the work mat.
Figure 4:
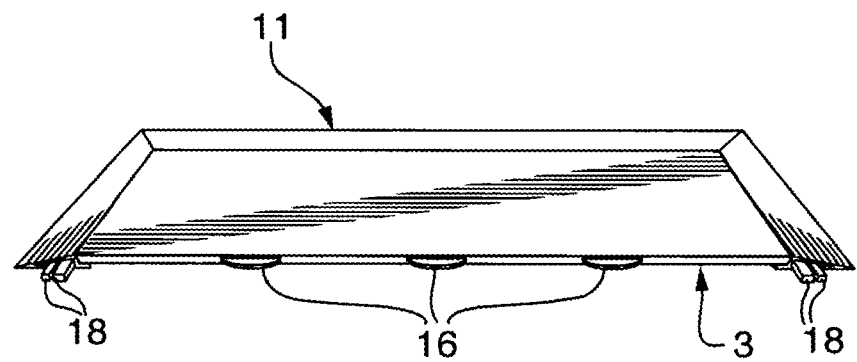
FIG. 4 is a perspective view of an inner end edge including projections of a second end section of the work mat.
Figure 5:
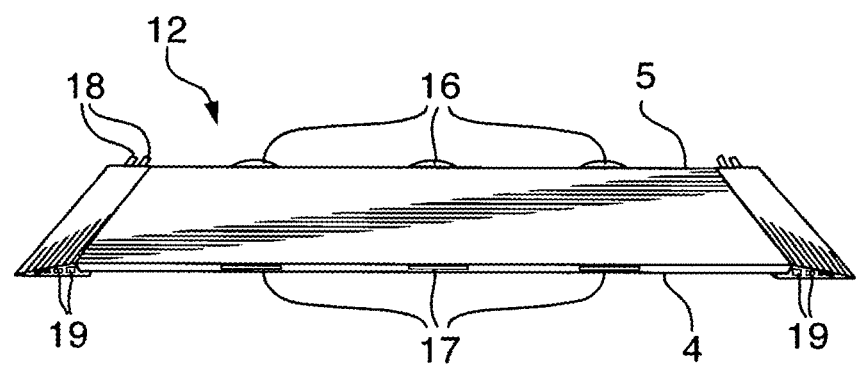
FIG. 5 is a perspective view of a middle or center section of a work mate having opposing inner end edges wherein one inner end edge includes projections and the opposing inner end edge includes sockets for cooperative engagement to sections having corresponding projections and/or sockets.
Figure 6:
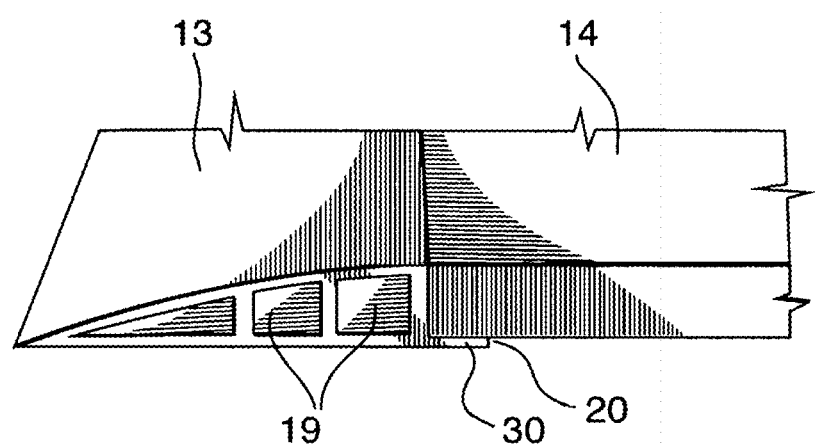
FIG. 6 is an end view of a border extruded from a polymeric material showing the hollow longitudinal cavities between the tip and end wall separated by vertical wall sections of webbing disposed between the top surface and base, and showing a portion of the base extending pass the end wall a selected distance for supporting the edge of a panel above the support surface or floor whereby the working mat is supported a selected distance above the support surface.

FIG. 3 shows a female section 10 including a rectangular multi-layer platform 14 including a top surface, a bottom surface, two long sides and two short sides. A border 13 extends around two short sides and one long side of the rectangle. The exposed side of the multi-layer platform 10 contains biscuit slots 17 to provide a proper joint with a mating section. The multi-layer platform 14 is one fourth to one inch or more thick. Preferably, the multi-layer platform 14 is in the range of one-half to three quarters of an inch.

As shown in the figures, the border 13 covers the edges of multi-layer platform 14 and tapers down to the floor to prevent a user from tripping on one of the edges. As seen in FIGS. 4-9, the border is a longitudinal extruded member having a generally triangular cross-sectional shape. With reference to FIG. 8, the triangle is a right triangle wherein the sloped surface or hypotenuse 26 is the only exposed side and provides an inclined plane reaching from the floor to the top surface of the multi-layer platform 14. The border 13 is formed form an extruded longitudinal tube or strip of polymeric material having a triangular cross sectional. A flat bottom or base 21 rests upon a support surface such as a floor. An end section or end wall 24 of the border 13 integrally joins the base 21 at a right angle of 90 degrees forming the short leg of the triangular member extending upward for abutting and cooperative engagement with a selected edge of the section or panel and is generally up to about two inches high and in at least one embodiment ranges from one fourth to two inches high.

Figure 13:
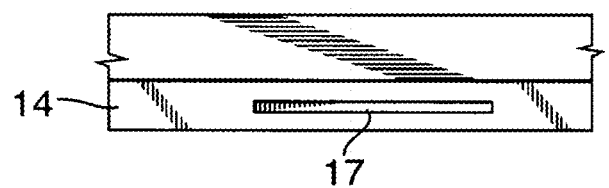
FIG. 13 is a perspective end view of the multi-layer platform showing an inner edge joining socket, pocket or slot, such as a "biscuit slot" for receiving and cooperatively engaging a portion of the biscuit for holding two sections together.
Figure 14:
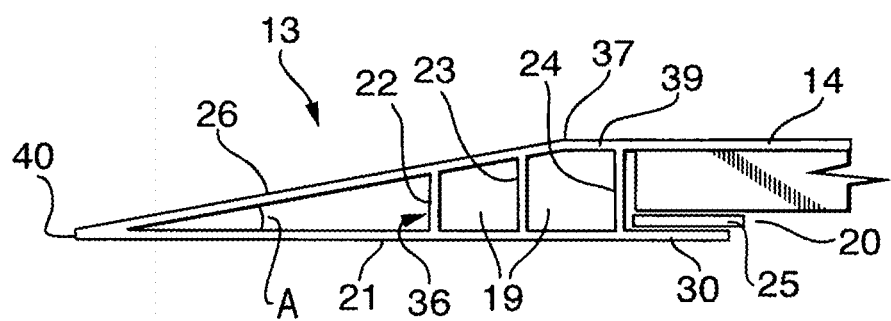
FIG. 14 is an end view of a left side border showing the platform section supported on a spacer disposed between the base flange and platform and showing the webbing for containing dowels rod members insertable into corresponding longitudinal cavities in an opposing right side border to hold modular sections together, wherein the top surface of the border is sloped upward to a point which is even with the surface of the platform and includes an obtuse angle and short segment which is even with the platform.

The top load supporting surface 22 of the border 13 integrally joins the top edge of the end wall 24 to the opposing front end edge of the base 21 at an acute angle of 45 degrees or less, preferably an angle less than thirty-five degrees and more preferably from about 5 to 35 degrees. One embodiment of the invention includes a border having a base 21 and top surface 26 forming an acute angle A in the range of eight to thirty-five degrees wherein the length of the top surface or hypotenuse 26 is in the range of two to eight inches in length and more preferably in the range of three to four inches in length. As shown in the drawings, the top surface 26 of the border forms an inclined plane extending upward from a tip 40 formed by a junction with the base 21 the floor or support surface, toward the top of the short end wall 24 to integrally join the front edge of the base 21 forming the hypotenuse whereby the border cross-sectional shape defines an inclined plane or slope. As shown in FIGS. 6-10 the plane is a straight line forming a substantially flat inclined plane; however, it is anticipated that the top surface 26 forming the hypotenuse could extend upward a selected length forming an extended included plane portion having a greater slope which then extends horizontally outward or at a selected obtuse angle 37 or curve forming a leg 39 joining the end wall 24 and abut the edge of the selected section as shown in FIG. 13. It is contemplated that the top surface 26 can also be extruded or molded having a slightly curved shaped forming either surface concave or convex surface extending from the tip 40 or pointed portion resting on the support surface to the end wall or having a curved portion therein between so long as the tip rests upon the support surface and the opposing end joins the end wall 24 providing a generally seamless transition from the border to the surface of the platform section 14. Moreover, the top sloped surface 26 may include an irregular, stamped, grooved or stamped pattern 42 to improve traction and minimize slippage by the user.

The web 36 comprising at least two spaced apart vertical walls 22 and 23 are parallel to the short end 24 and provide compression and lateral support to the triangular boarder 13 against collapse of the hypotenuse 26, when the boarder 13 has a downward load applied. FIGS. 6-11 show an end view of a border extruded from a polymeric material showing the hollow longitudinal cavities between the tip and end wall separated by vertical wall sections of webbing disposed between the top surface and base. Connecting means comprising dowel members are inserted into the distal ends of the longitudinal cavities as means of joining two adjacent sections of border together. Of course, additional longitudinal members can be inserted into the longitudinal passages of the border to provide structural strength thereto and minimize compression of same under load.

A border base flange which may be an extension of the base 21 defines a flange 30 extending past the end 24 of the border. The extension 30 has a length in the range of one quarter inch to two inches and is preferably in the range of three quarters inch to one inch long. The thickness of the extension 30 is in the range of one eight to one quarter inches thick.

FIG. 8 shows the multi-layer platform 14 resting on the extension 30 of the border piece 13. This provides a gap 20 between the bottom surface of the platform 14 and the top surface of the floor. This gap 20 is preferably in the range of one eighth of an inch to two inches. A spacer 25 as shown in FIG. 11 may be added to the between the platform 14 and the top surface of the flange 30 to increase the thickness of the base flange to provide a seamless smooth surface between the surface 26 of the border and the platform surface 14.

Figure 8:
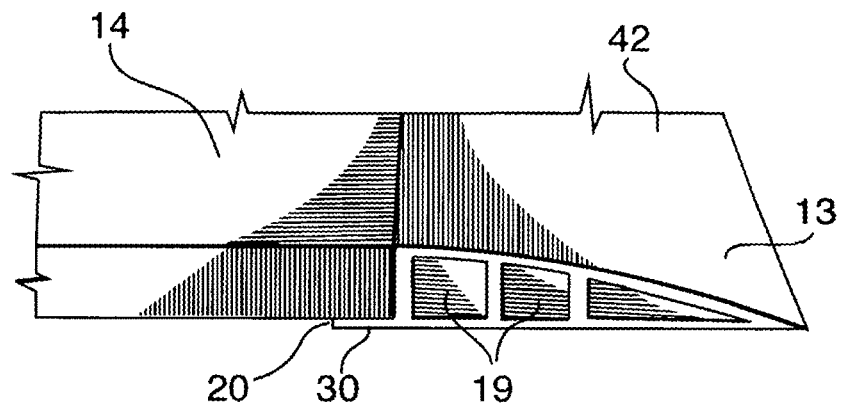
FIG. 8 is a perspective end view of a right side border piece suspending the multi-layer platform on the base flange of the border and showing the gap formed between the bottom surface of the platform and the supporting surface or floor and showing the longitudinal cavities formed in the border by the webbing.
Figure 9:
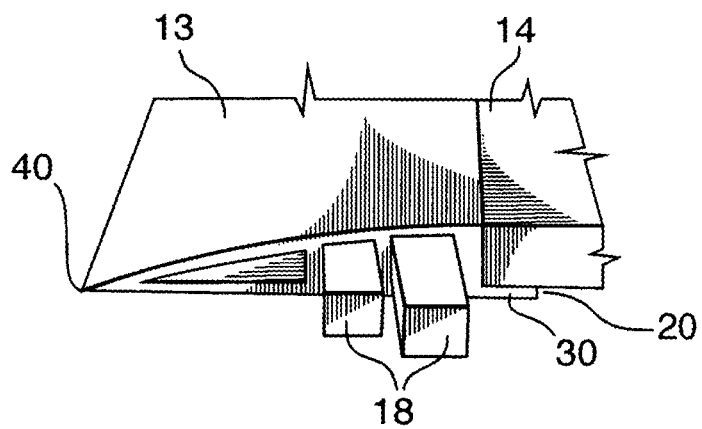
FIG. 9 is a perspective end view of a right side border piece suspending the multi-layer platform on the base flange of the border and showing the gap formed between the bottom surface of the platform and the supporting surface or floor and showing dowel members disposed within the longitudinal cavities formed in the border by the webbing.

With reference to FIGS. 8 and 9, it can be seen that the top surface of the platform 14 is at the same height as the top edge of the border 13. The height 24 of the triangular boarder 24, the thickness of the multi-layer platform 14, and the thickness of the extension 30 and spacer 25 (if used) are selected so that the top surface of the platform 14 is about even with the top edge of the border 13.

Figure 7:
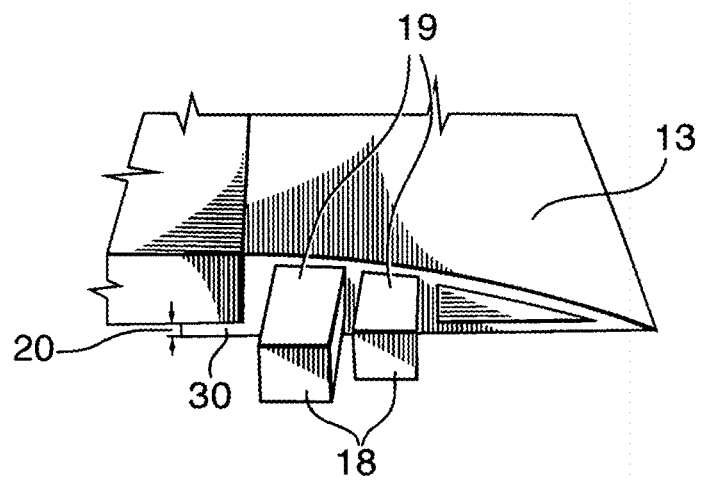
FIG. 7 is an end view of border showing the base flange suspending the multi-layer platform above the floor and showing dowel members disposed a selected distance into the hollow longitudinal cavities formed of the webbing defining square wooden dowels for inserting into corresponding longitudinal cavities of a second border cooperatively engaging and joining same together extending same.

FIGS. 4-5, and 6-7 show mating pairs of female-male ends of the border piece 13. The male end in FIG. 7 is defined by the two wooden dowels 18 which will be forcibly inserted into the respective apertures 19 of the female end in FIG. 6. Therefore, the combination of dowels 18 inserted into apertures 19 and the insertion of the biscuits 16 into the biscuit holes 17 provide a secure joint between mating sections of work platform mat. The biscuits 16 insure that when a user stands on one section of the work platform mat, edges of that section don't dip below the adjoining and causing a trip hazard. If desired, the mating edges of the multi-layer platforms and the biscuit joints are glued to provide a stronger joining of the sections.

Figure 10:
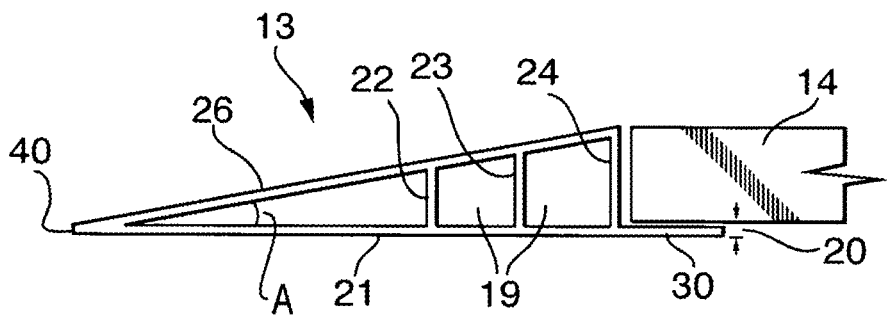
FIG. 10 is an end view of a left side border showing the platform section supported on the base flange above the support surface and showing the webbing for containing dowels rod members insertable into corresponding longitudinal cavities in an opposing right side border to hold modular sections together.
Figure 11:
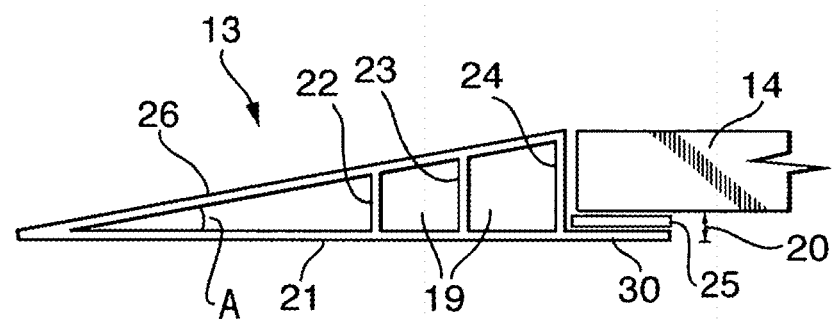
FIG. 11 is an end view of a left side border showing the platform section supported on a spacer disposed between the base flange and platform and showing the webbing for containing dowels rod members insertable into corresponding longitudinal cavities in an opposing right side border to hold modular sections together.
Figure 12:
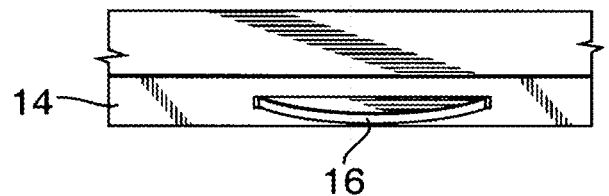
FIG. 12 is a perspective end view of the multi-layer platform showing an inner edge joining projection or 'biscuit' inserted therein for cooperative engagement with a 'biscuit' slot.

FIGS. 10 and 11 show partial mating sides of multi-layer platforms 14 of two modular sections of the work platform mat 5. The edges of adjoining section alternately contain biscuit slots 17 and biscuits 16 which inserted into biscuit slots 17 to align and secure the edges of the adjacent multi-layer platforms 14. If desired, glue is included in the joining of two multi-layer platforms 14. With this biscuit joint, the top surfaces of the two adjacent multi-layer platforms are guaranteed to be approximately flush with one another, thus preventing trip hazards at the edges.

Figure 15:
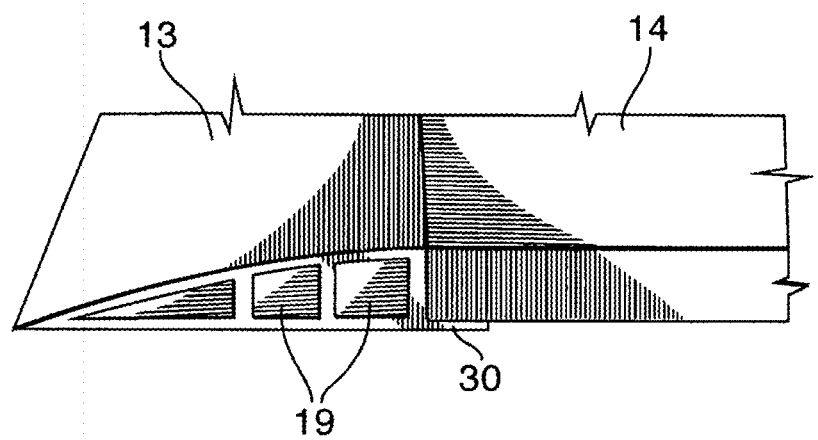
FIG. 15 is an end view of a border extruded from a polymeric material showing the hollow longitudinal cavities between the tip and end wall separated by vertical wall sections of webbing disposed between the top surface and base, and showing a portion of the base extending pass the end wall a selected distance for supporting the edge of a panel above the support surface or floor whereby the working mat is supported a selected distance above the support surface and a compression pad abuts the base flange and is disposed between the platform and the supporting surface.
Figure 16:
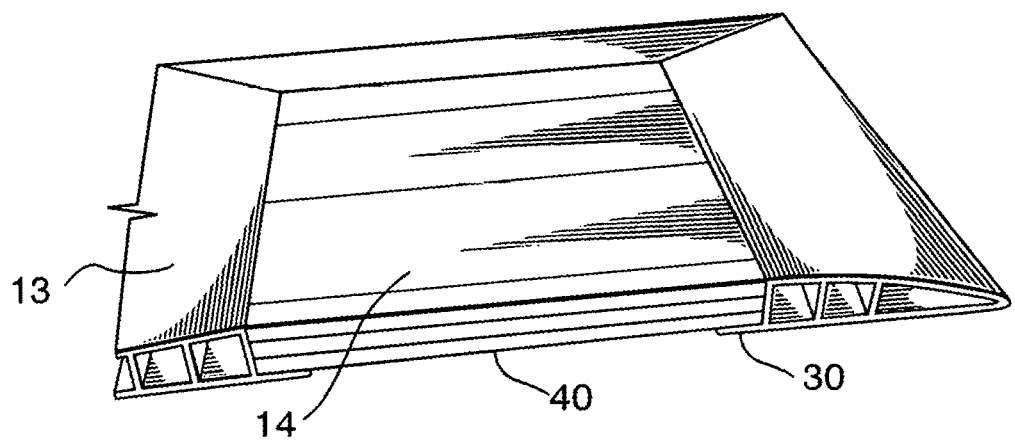
FIG. 16 is a perspective edge view of an expandable section of mat with a chamfered webbed polymer border extending from the outside edge of the work platform surface bordering three sides of the work platform.
Figure 17:
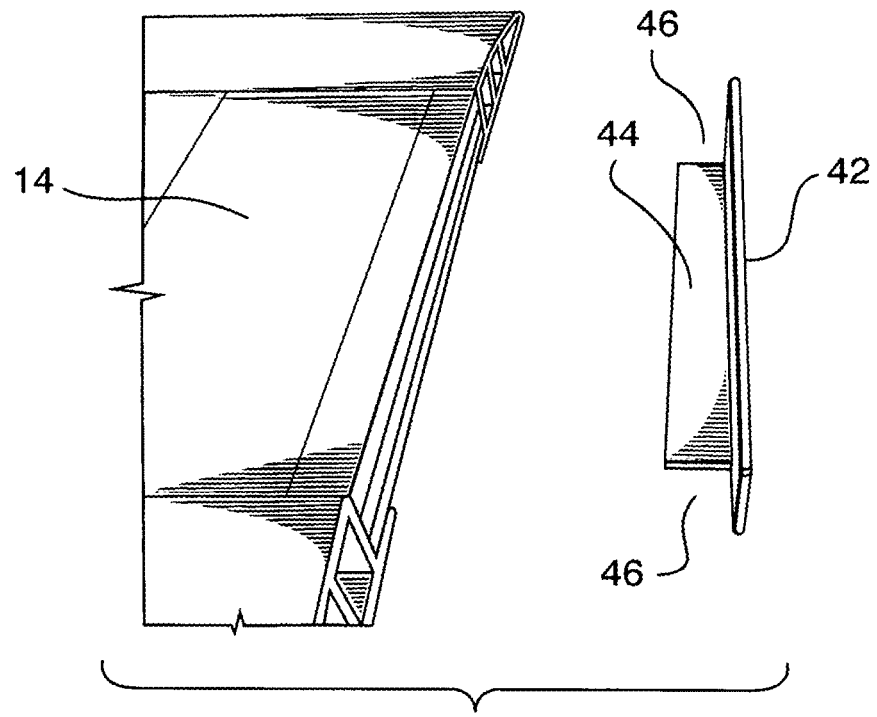
FIG. 17 is a perspective side view of an expandable section of the work platform and mat of FIG. 16 showing a L-connector or L-molding spaced apart and aligned with a horizontal medial groove or slot in the work platform wherein the connector cooperatively engages the inner side edge of the expandable platform, providing a smooth outer side edge suitable for placement against the side of a piece of equipment.

FIG. 15 is an end view of a border extruded from a polymeric material showing the hollow longitudinal cavities between the tip and end wall separated by vertical wall sections of webbing disposed between the top surface and base, and showing a portion of the base extending pass the end wall a selected distance for supporting the edge of a panel above the support surface or floor whereby the working platform mat is supported a selected distance above the support surface and a compression pad 35 abuts the base flange and is disposed between the platform and the supporting surface.

Figure 21:
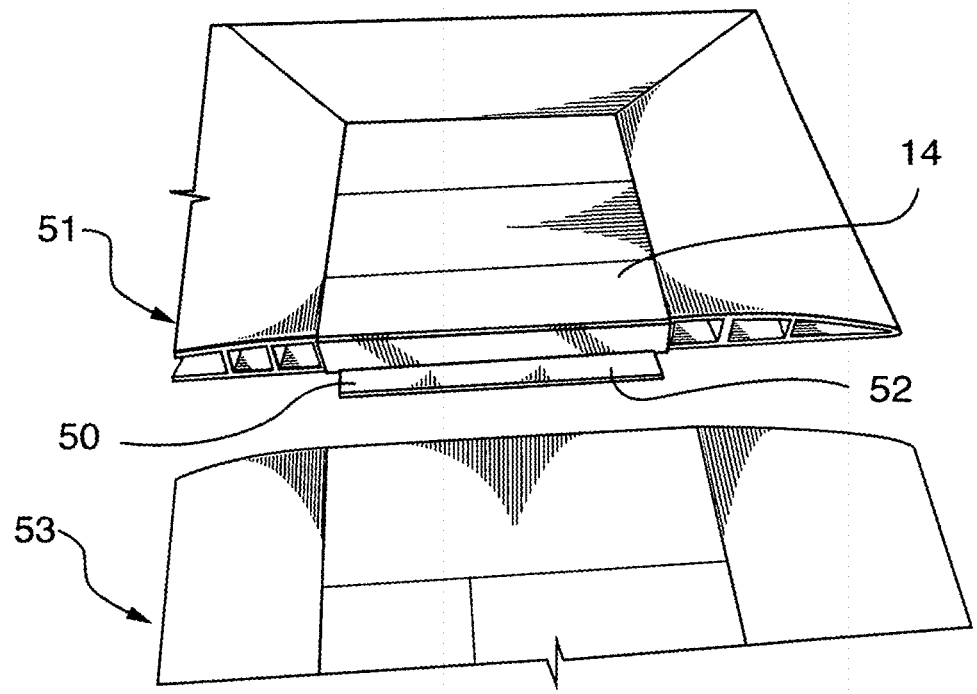
FIG. 21 shows two expandable mat sections nearly joined with one T-connector showing the base having a length extending the length of the work platform disposed between the border base flanges of the border and the upward extending central flange extending past the base flange to cover the inner edge of the work platform between the borders.
Figure 22:
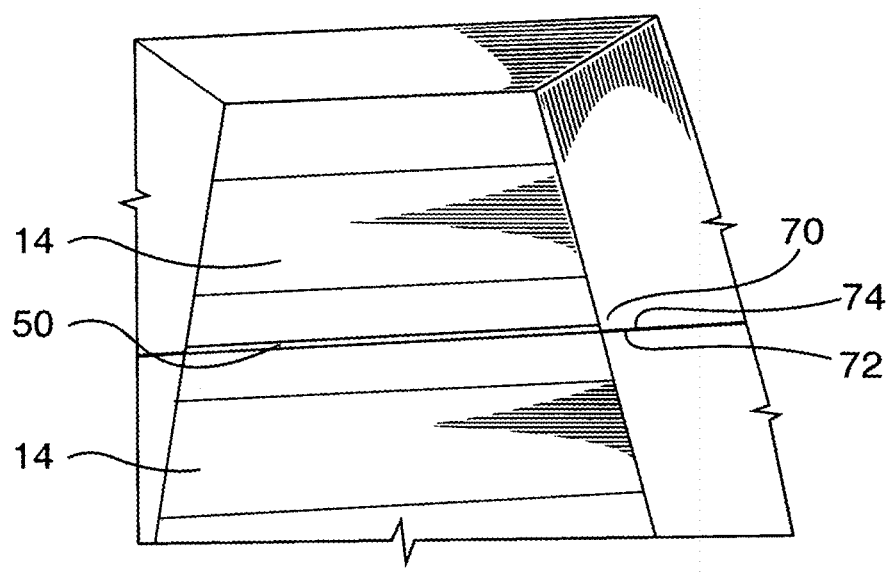
FIG. 22 is a perspective view showing two adjacent platform sections joined with one T-connector supporting in the inner edges of adjacent platform sections with the work platform sections abutting one another.
Figure 23:
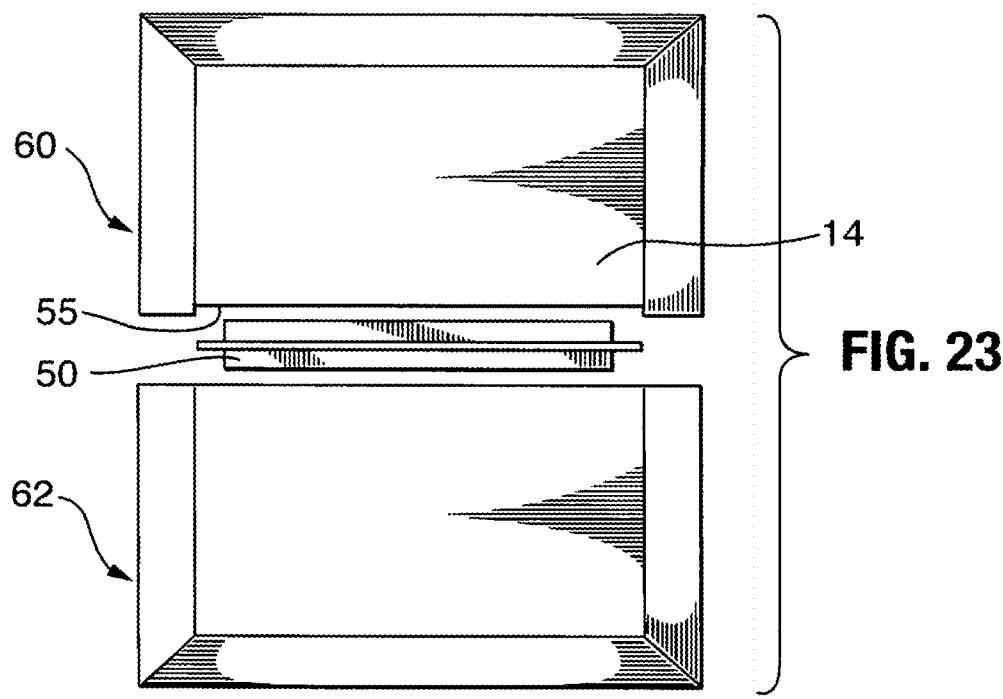
FIG. 23 is a top view showing adjacent expandable work platform mat sections spaced apart from one another having a T-connecter disposed therebetween and the length of the T-connector flange extending pass the base flange to the edge of the chamfered border.
Figure 24:
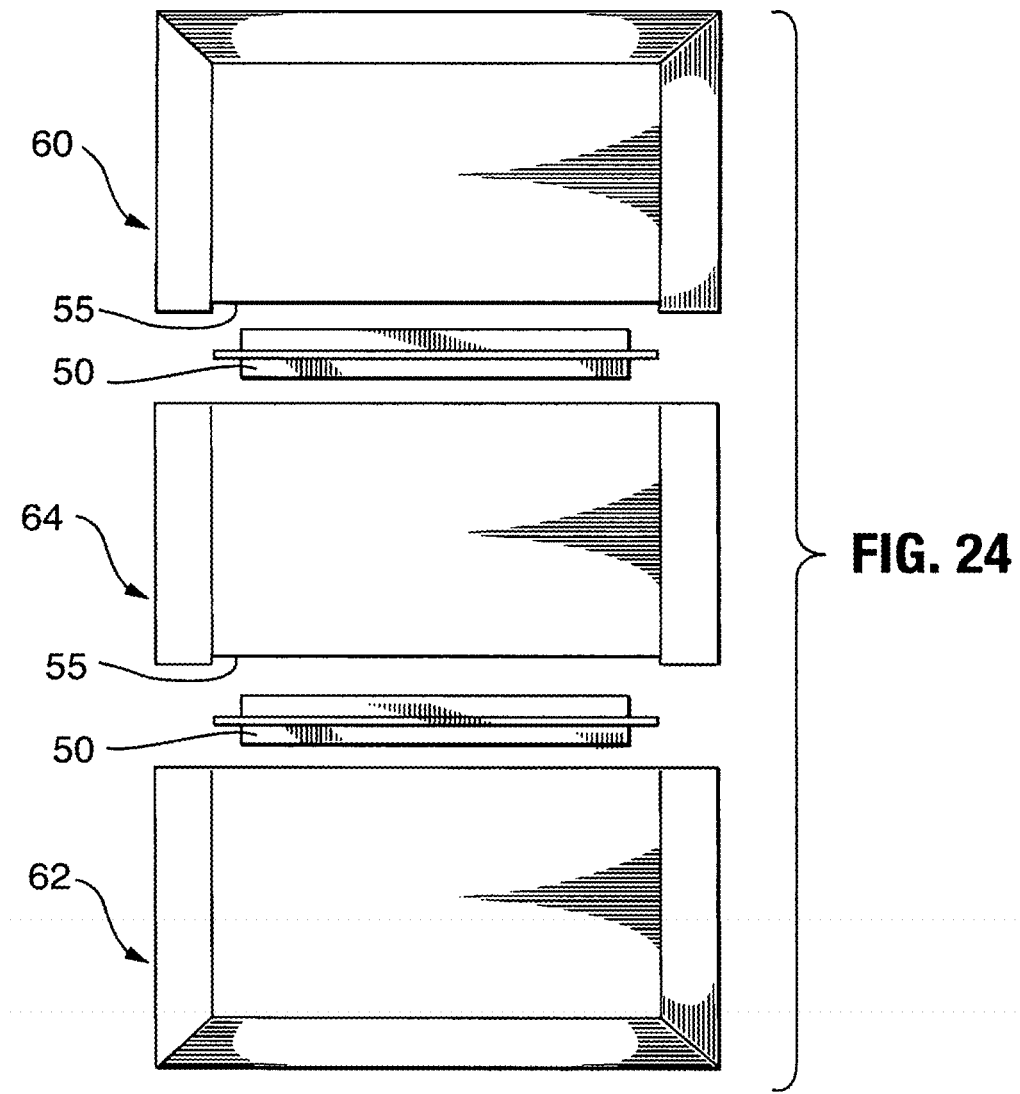
FIG. 24 shows three expandable work platform sections spaced apart and aligned with T-connectors disposed therebetween.
Figure 25:
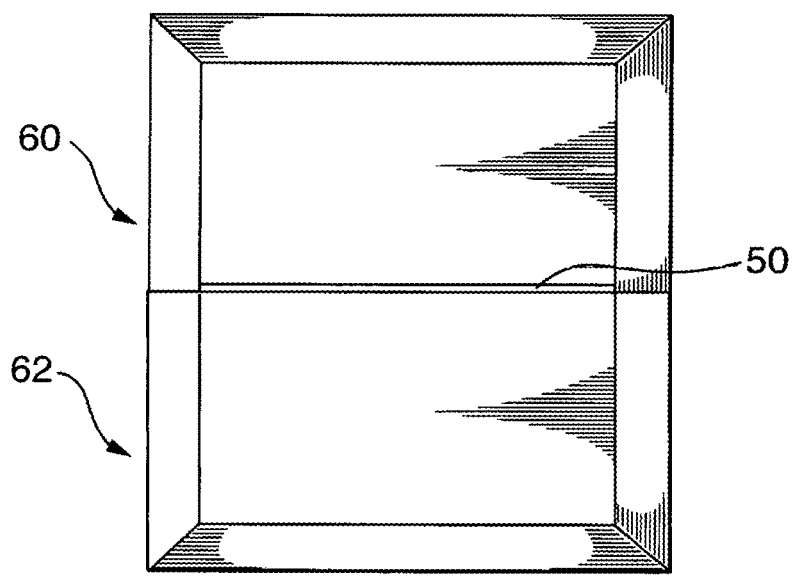
FIG. 25 is a top view showing the two expandable work platform sections of FIG. 23 joined together with the T-connector in between wherein the top edge of the T-connector flange emends upward a selected distance to provide a flush surface with the surface of the work platform sections joined thereby.
Figure 26:
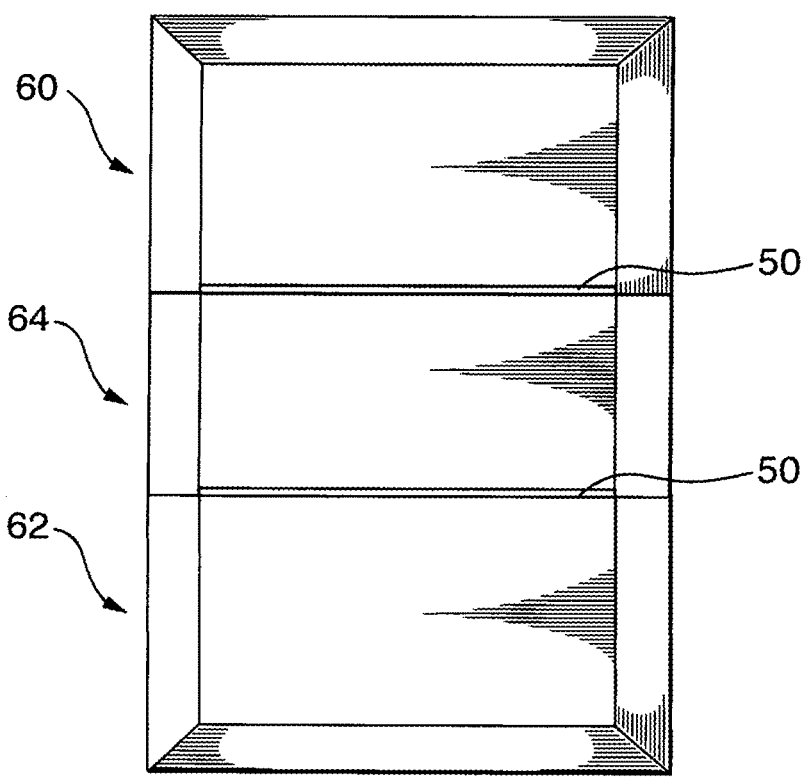
FIG. 26 is a top view showing the three expandable work platform sections of FIG. 24 joined together with the T-connector in between wherein the top edge of the T-connector flange emends upward a selected distance to provide a flush surface with the surface of the work platform sections joined thereby.
Figure 27:
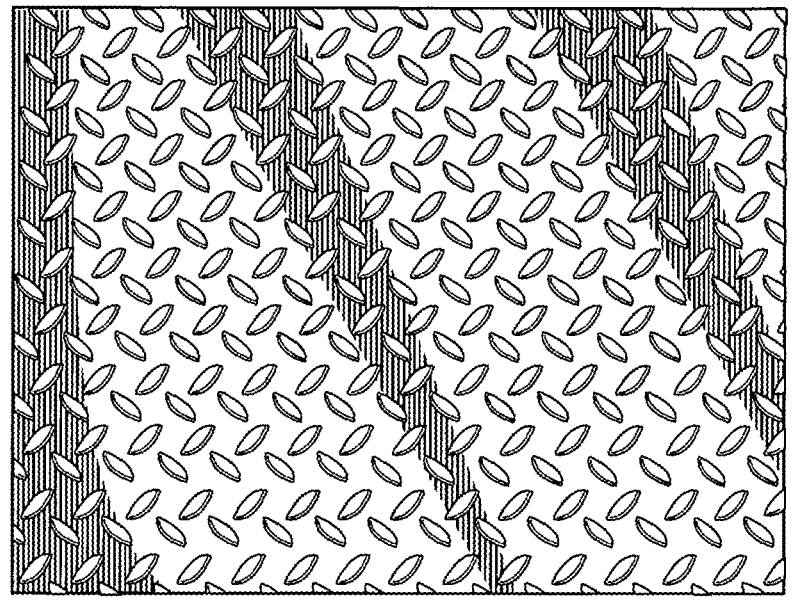
FIG. 27 is a perspective top view of a diamond plate synthetic mat material used as a middle layer in the multi-layer platform.
Figure 28:
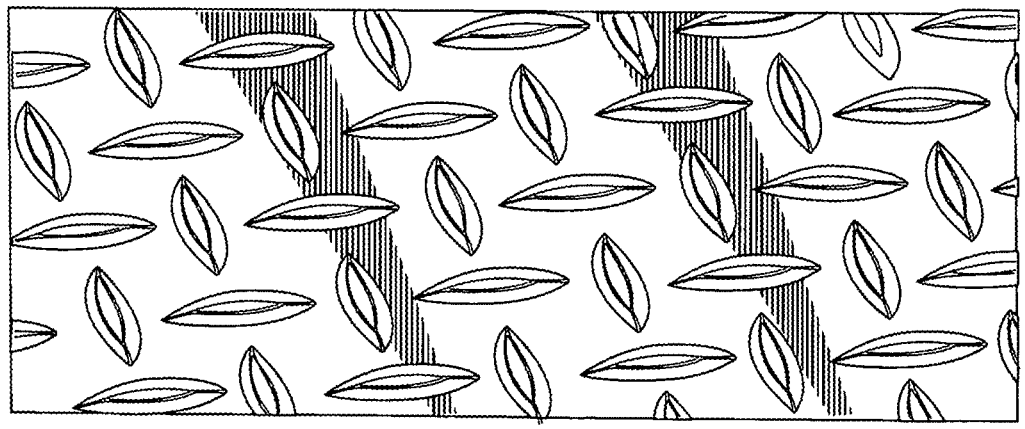
FIG. 28 is an enlarged view of FIG. 27 showing the diamond plate surface formed in a closed cell polymer.
Figure 29:
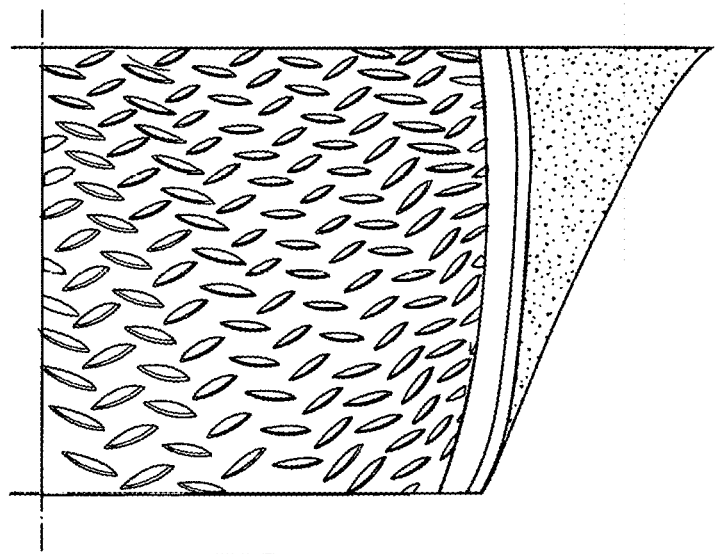
FIG. 29 shows a perspective view of the closed sponge cell construction of the diamond plate mat.
Figure 30:
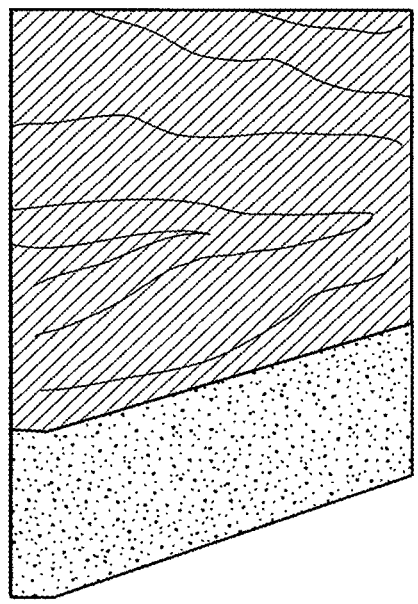
FIG. 30 is side view of the closed sponge cell material of the diamond plate.
Figure 31:
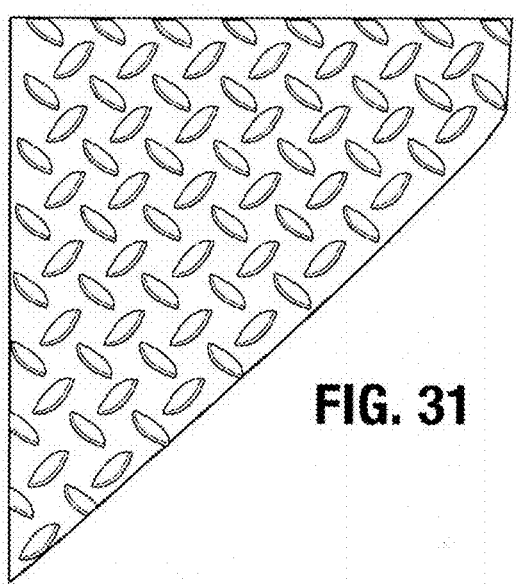
FIG. 31 is a perspective view of an a diamond pattern mat.
Figure 32:
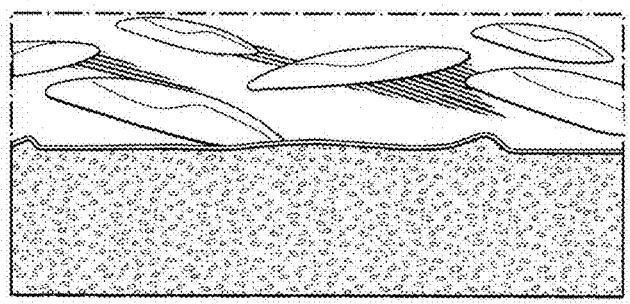
FIG. 32 is a side view showing a closed sponge cell material having a ⅝ inch thickness and thin diamond pattern top surface.

As illustrated in FIGS. 16-26, expandable work platform mat sections 51 and 53 are joined without the use of biscuits and biscuit slots but rather are joined together at the interior or inner edges by a longitudinal member having a cross sectional shape of an inverted "T" wherein a medial or center vertical flange extends upward from the base defining horizontal flanges. As illustrated in FIGS. 15-25, the inverted T-connector 50 includes vertical flange 57 extending upward dividing a flat base into a pair of horizontal base flanges 52 and 54. The base flanges extend into cooperatively sized and shaped slots 40 formed in the interior edges of the center of the work platform between the chamfered borders between the multi-layer platform 14 and the floor. FIG. 21 shows that wall 54 is under the platform 14 of the expandable platform mat section 51 and the other wall 52 will be under the platform 40 of the expandable mat section 53 when that section is brought onto the T-connector. Holding means such as an adhesive, screws, rivets, nails, hook and loop fasteners, snap together flanges, ball and socket or friction fit can be used to fix the platforms together and/or to the T-connector. A plurality of expandable platform mat sections may be assembled as shown in FIGS. 24 and 26, to form a work mat of any desired length.

Thus, a first expandable work platform mat section including a first inner edge joined to a second inner edge of a second expandable work platform section with an elongated T-connector comprising an upward extending central flange extending upward from a base flange forming a first base flange portion and a second base flange portion, the first base flange portion cooperatively engaging a first horizontal slot formed in the first inner edge of the first expandable work platform mat section in a tongue and groove arrangement and the second base flange portion cooperatively engaging a second horizontal slot formed in the second inner edge of the second expandable work platform mat section in a tongue and groove arrangement for aligning and holding the first expandable work platform mat section to the second expandable work platform section.

The height of the central flange can be selected so that the top of the flange terminates at a point below or even with the top surface of the work platform. A strip of compressible material, or a cover strip of metal of other material can be used to cover a gap or seam between the adjacent work platform sections if a gap 74 is formed between adjacent border edges 70 and 72 due to the thickness of the vertical edge wall 57.

One or more of the adjacent work platform sections may also include a slot 55 formed at the outer edge of the platform 14 for cooperative engagement with the top edge side portions of the vertical flange or the T-connector, as shown in FIG. 23. As the T-connector is urged against that edge of the platform 14, the vertical wall slides into the slot 55. The resulting assembly, shown in FIG. 25, contains no gap 74 but results an a solid and smoothly joined assembly.

Figure 18:
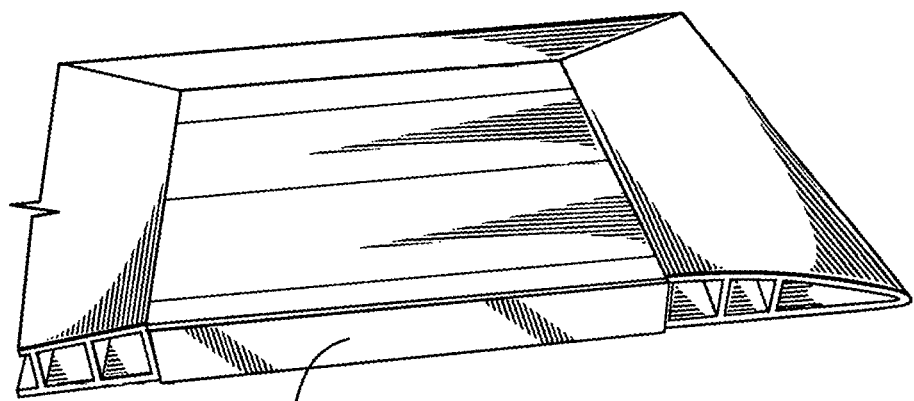
FIG. 18 is a perspective view of the expandable mat of FIG. 17 showing the L-connector engaging the slot of the inner side edge of the mat showing the distal ends flush with the platform section.
Figure 19:
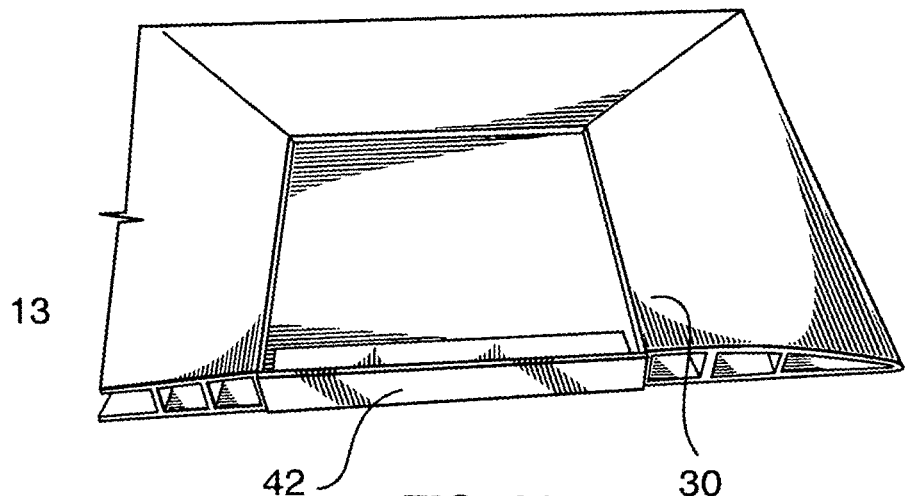
FIG. 19 is a perspective view of the inner side of the expandable mat section with the L-connector installed covering a portion of the chamfered edge border showing the distal ends extending past the platform section a selected distance covering a portion of the border.
Figure 20:
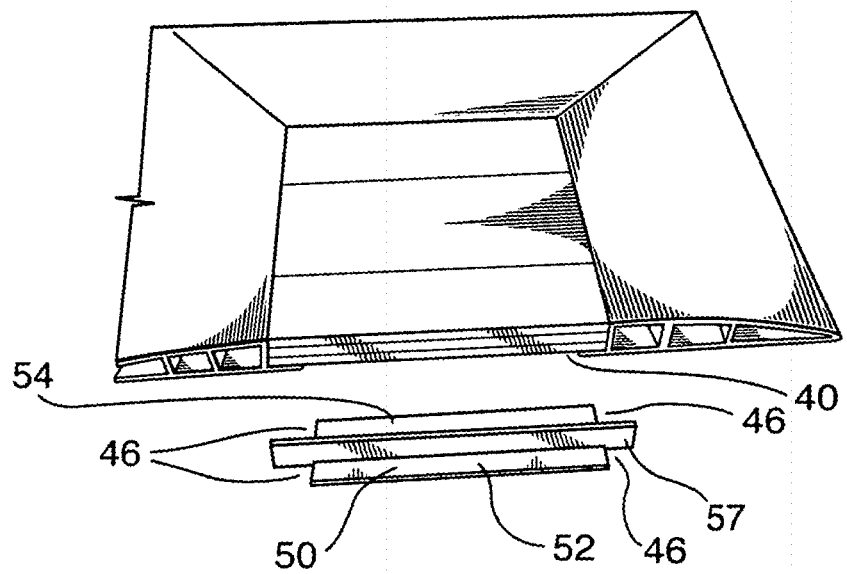
FIG. 20 is a perspective side view of the expandable section of the work platform of FIG. 16 including a longitudinal member having a T-shaped cross sectional area defining a T-connector which includes an inner horizontal base edge portion which cooperatively engages the inner edge of a first expandable work platform mat section and an opposing outer horizontal base edge portion which engages the inner edge of an adjacent expandable work platform mat section cooperatively engaging same.

A finished mat shown as in FIG. 18 is uses an L-connector 42 comprising a longitudinal member having an L-shaped cross sectional area whereby a horizontal flange 44 slides into a slot formed in the inner edge of the platform and the vertical flange abuts the rough edge of the platform 14. A slot 55 may be formed in the inner edge of the platform 14 to cooperatively engage the vertical flange portion of the L-connector.

It is anticipated that at least the top surface of the multi-layer platform 14 of the modular sections are coated with a smooth, textured, granular or electro-static dissipative finish or laminate.

Furthermore, a compressible material can be fastened underneath or above the wood offering further ergonomic properties combined with the function of the platform. An even or flush horizontal work surface can be provided where the highest point of the vertical wall edge of the tapered border adjoins the top work surface of a compressible material. A seamless and flush joint is formed with the top of a floor panel or floor section supported by a compressible bottom layer. The layer of compressible material applied to the top of the platform has a compression force deflection according to ASTM D 3574-08 up to 100 psi and preferably from 5 to 75 pounds per square inch. A compressible material may be used used on the bottom side of the floor platform or section supporting same either alone or in combination with compressible material on the top surface which provides the floor panel, floor platform or section with a compression force deflection according to ASTM D 3574-08 up to 100 psi and preferably from 5 to 75 psi. The compressible material on a top surface of the platform, section, or floor panel ranges in compression set under constant deflection according to ASTM D 1056-00 up to 70 psi. and preferably from 3-70 psi. The compressible material on the bottom side ranges in compression set under constant deflection according to ASTM 1056-00 up to 70 psi and preferably from 3-70 psi.

The attached compressible material comprises of an open or closed cell foam material, or vinyl like composite. Both open-cell and closed-cell products are available in a large variety of compression deflection ranges. Padding may still be capable of providing proper ergonomic support to both stationary and walking activities Open cell material looks and acts like a sponge. Closed cell material looks like a bunch of bubbles glued together. When force is applied to an open cell product, after release of the force, the product bounces back to shape because the open cell structure allows air to flow back into the material. On the contrary, when force is applied to a closed cell product, some of the bubbles may burst, resulting in a loss of cushion and support. The closed cell structure impedes the flow of air so that the structure does not return to its original shape as quickly after release of the force.

Open-cell foam products typically have lower compression set numbers. However, their structure permits the absorption of water, which may require them being sealed to prevent mold and mildew when utilized in the present invention. For example, Rubberlite Inc. offers a polyurethane open-cell product called HYPUR-CEL® H0705 that may be used in the present invention. Rubberlite Inc. also offers closed-cell sponge rubber materials that may be used in the present invention. Both products exhibit 40% compression set. Armacell LLC offers a neoprene blend named IG-2 that supports 25% compression set. These materials are provided for exemplary purposes only and not intended to limit the scope of the present invention.

Example 1

For example, one preferred embodiment of the present invention would include the following features and is described as follows:

The modular wood platform ranges from about ⅛ to 2 inches in thickness with the bottom surface raised off the floor with a more preferable range of about ¼ to 1 inch for suspension effect comprising a spring bounce and absorption effect for weight bearing stress in static and rhythmic posture. The polymer edging raises the wood platform product off of the floor and is incorporated in and around the tapered border and supports joining sections of the platform.

A tapered border provides safe ingress and egress transition on and off from the wood platform is affixed or attached to a wood platform providing a seamless transition therewith. The attached border comprises a polymer and more particularly a plastic or other synthetic material such as polyvinylchloride ("PVC"), an elastomer material, a rubber material, a polyblend (plastic and rubber composite material), or other polymeric compound or like material providing good resilience, traction, controlled compressibility, and insulating properties with a slope ranging up to 45 percent, more preferably from 1 to 45 percent, more preferably from 5 to 40 percent and even more preferably from 8 to 35 percent. In one preferred embodiment, the attached border ranges in width from 2 to 8 inches depending upon the thickness of the wood platform base with a slope ranging from 8%-35%.

In at least one embodiment, the sloped attached border system includes panels or sections having two or three side and end surface areas opposite the sloped side area comprising at least one vertical plane or side edge and one horizontal plane ranging from ½" to 1 inch for adjoining the panels or sections of the wood platform.

The sloped attached chamfered border system comprises a tapered body having a selected slope in a range of from 3 to 45 degrees and more preferably from about 8-35 degrees with two or three side and/or end surface edge areas opposite the sloped side with a vertical plane or thickness ranging from ⅛ to 2 inches. The adjoining sloped border contains a channeled or hollow inner configuration that enables modular connection methods of the ergonomic wood and border system via a biscuit and insert configuration.

The sloped border having an internal construction contains at least one, preferably two, and more preferably a plurality of between 3-5 channels for connection to the other like modular constructed platform utilizing connectors made of wood, plastic, nylon, PVC or metal in either modular or permanent male and female connection in tongue and groove form and function. The wood platform ranges in height up to three inches, and typically has a thickness of from ⅛ to 2 inches with an attached border system containing a sloping or tapered edge or chamfered border of 5-35 percent and having an overall width extending from the wood platform outer peripheral edge of from 2 to 8 inches.

The chamfered border optionally includes a hollowed interior portion optionally including a selected number of spaced apart vertical support walls or up to five inside vertical supports and at least one and more preferably from 3 to 5 horizontal support members to provide modular male/female connection. A second wood platform or section with an adjoining sloped or chamfered border with a selected corresponding sized top vertical range of for example ½ to 2 inches and a bottom sloped vertical height of under ⅜" can be connected thereto.

The surface of the wood platform with adjoining sloped border system can be coated with a smooth, textured, granular, or electro static dissipative finish or laminate and may include compression properties. A modular raised wood platform with a sloped border on up to four sides with the vertical riser consisting of PVC or like material on the bottom surface is either integrated into the sloped border material or independently fastened to the bottom of wood platform. The raised wood platform comprising or consisting of a sloped border system supports the wood above a resting surface or the ground while additionally providing anti-slip bottom surface traction to the platform. The horizontal plane of surface area of the raised wood platform is even with or as much as ⅛" greater than the top vertical rise of the tapered border.

As shown in FIG. 34, the multi-ply platform have a bottom wood or wood composite base, a thin middle layer without sponge cell material having a diamond plate patterned surface supporting a thick closed cell polymer material forming the top layer so that the multi-layer platform is supported above the floor surface. FIG. 35 shows a multi-ply platform having a bottom wood or wood composite base, a middle layer without sponge cell material and having a diamond plate patterned surface supporting a closed cell polymer material forming the top layer so that the multi-layer platform is supported above the floor surface affixed to a wedge shaped border. FIG. 35 is a side view of the multi-ply platform showing a bottom wood or wood composite base substrate, a thin middle layer mat without sponge cell material and having a diamond plate patterned surface supporting a thin rubber or synthetic material forming the top layer.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. A modular multi-ply platform comprising:
    at least one female work mat section comprising a first multi-layer platform having a top surface, a bottom surface, and at least one female inner edge;
    at least one male work mat section comprising a first multi-layer platform having a top surface, a bottom surface, and at least one male inner edge;
    said at least one female work mat including a first female side edge border parallel and spaced apart from a second female side edge border connected by a female end edge border, each one having a chamfered edge including at least one conduit extending along a longitudinal side edge comprising spaced apart web elements;
    said at least one male work mat including a first male side edge border parallel and spaced apart from a second male side edge border connected by a male end edge border, each one having a chamfered edge including at least one conduit extending along a longitudinal side edge comprising spaced apart web elements;
    said at least one female work mat aligning opposite said at least one male work mat with said at least one female inner edge opposing said at least one male inner edge;
    at least one connecting means of corresponding size and shape disposed in said first female side edge conduit and said corresponding first male side edge conduit, and at least one connecting means of corresponding size and shape disposed in said second female side edge conduit and said corresponding male second side edge conduit for cooperative engagement of said at least one female inner edge and said at least one male inner edge;
    a base of said border extends pass said end wall forming a border base flange, whereby said end wall of said edge border abuts a side edge of said platform and said border base flange supports a bottom edge of said platform;
    said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section; and
    said multi-layer platform having a top surface and a bottom surface, further comprising a non-compressible wood base bottom layer covered by a limited compression layer having compression deflection or resistance typically less than 10 pounds per square inch, and said top surface including friction enhancing means selected from the group consisting of a raised pattern, a plurality of knots, a plurality of bumps, a plurality of ridges, a plurality of dimples, a plurality of grooves, a plurality of pits, a plurality of inverted dimples, a recessed area, a rubber material, a neoprene material, a vinyl chloride material, a styrene butadiene rubber ("SBR") material, a nonslip coating composition, a textured material, a granular material, an electro-static dissipative coating, and combinations thereof.

2. The modular multi-layer platform of claim 1 wherein said borders comprise elastomeric synthetic material.

3. The modular multi-layer platform of claim 1 wherein at least a top surface of said multi-layer platforms is covered with a covering selected from the group consisting of smooth, textured, granular, and electrostatically dissipative coatings.

4. The modular multi-layer platform of claim 1, wherein said top surface of said edge border is selected from the group consisting of an irregular pattern, a stamped pattern, a grooved pattern, and combinations thereof.

5. The modular multi-layer platform of claim 1, wherein said web comprises at least two spaced apart vertical walls spaced apart from said end wall for providing compression and lateral support.

6. The modular multi-layer platform of claim 5, including longitudinal border support members inserting into a longitudinal passage between said spaced apart vertical walls of said edge border to provide structural strength thereto and minimize compression under load.

7. The modular multi-layer platform of claim 1 wherein said flat base extends pass said end wall forming a border base flange, whereby said end wall of said edge border abuts a side edge of said platform and said border base flange supports a bottom edge of said platform.

8. The modular multi-layer platform of claim 7, including a spacer disposed on a top surface of said border base flange supporting said platform above a top surface of said floor.

9. The modular multi-layer platform of claim 1, wherein said connecting means comprises a dowel.

10. The modular multi-layer platform of claim 1, including a selected number of expander work mat sections each one comprising:
   at least one expander work mat section comprising a first multi-layer platform having a top surface, a bottom surface, and an expander female inner edge and an expander male inner edge;
   said at least one expander work mat including a first expander side edge border parallel spaced apart from a second expander side edge border, each one having a chamfered edge including at least one conduit extending along a longitudinal side edge comprising spaced apart web elements;
   said at least one expander work mat including a first expander side edge border parallel and spaced apart from a second expander side edge border connected by an expander end edge border, each one having a chamfered edge including at least one conduit extending along a longitudinal side edge comprising spaced apart web elements;
   said expander female inner edge aligning opposite of said inner edge of said at least one male work mat and said expander male inner edge aligning opposite of said inner edge of at least one female inner edge;
   at least one connecting means of corresponding size and shape disposed in said first female side edge conduit and said corresponding first expander side edge conduit, and at least one connecting means of corresponding size and shape disposed in said male side edge conduit and said corresponding expander second side edge conduit for cooperative engagement of said at least one female work mat with said expander work mat and said at least one male work mat;
   said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;
   said web comprises at least two spaced apart vertical walls spaced apart from said end wall for providing compression and lateral support;
   said base of said border extends pass said end wall forming a border base flange, whereby said end wall of said edge border abuts a side edge of said platform and said border base flange supports a bottom edge of said platform; and
   a longitudinal border support member inserting into a longitudinal passage between said spaced apart vertical walls of said edge border to provide structural strength thereto and minimize compression under load.

11. The modular multi-layer platform of claim 10, further comprising an L-connector spaced apart and aligned with a horizontal medial slot in said at least one female work mat cooperatively engaging an inner side edge thereof flush with said female end edge border.

12. The modular multi-layer platform of claim 10, said connecting means including a first expandable work platform mat section including a first inner edge joined to a second inner edge of a second expandable work platform section with an elongated T-connector comprising an upward extending central flange extending upward from a base flange forming a first base flange portion and a second base flange portion, said first base flange portion cooperatively engaging a first horizontal slot formed in said first inner edge of said first expandable work platform mat section in a tongue and groove arrangement and said second base flange portion cooperatively engaging a second horizontal slot formed in said second inner edge of said second expandable work platform mat section in a tongue and groove arrangement for aligning and holding said first expandable work platform mat section to said second expandable work platform section.

13. The modular multi-ply platform of claim 1 further comprises a bottom layer having a wood or wood composite base, and at least one layer comprising a limited compression layer.

14. The modular multi-ply platform of claim 13, wherein said limited compression layer is selected from the group consisting of an open cell foam, a closed cell foam material, a polyurethane, a neoprene, a vinyl composite and combinations thereof.

15. The modular multi-ply platform of claim 13, wherein said limited compression layer have a compression force deflection to ASTM D 3574-08 of up to 100 psi.

16. The modular multi-ply platform of claim 13, wherein said limited compression layer has a compression force deflection to ASTM D 3574-08 in a range of from between 5 to 75 psi.

17. The modular multi-ply platform of claim 13, wherein said limited compression layer have a compression set of from 25 to 40 percent.

18. The modular multi-ply platform of claim 1 wherein a polymer edging raises said bottom surface is raised from ⅛ to 2 inches off a floor for a suspension effect comprising a spring bounce and absorption effect for weight bearing stress in static and rhythmic posture.

19. A modular multi-layer platform comprising:
   at least one female work mat section comprising a first platform having a top surface, a bottom surface, and at least one female inner edge;
   at least one male work mat section comprising a first platform having a top surface, a bottom surface, and at least one male inner edge;
   said at least one female work mat including a first female side edge border parallel and spaced apart from a second female side edge border connected by a female end edge border, each one having a chamfered edge including at least one conduit extending along a longitudinal side edge comprising spaced apart web elements;
   said at least one male work mat including a first male side edge border parallel and spaced apart from a second male side edge border connected by a male end edge border, each one having a chamfered edge including at least one conduit extending along a longitudinal side edge comprising spaced apart web elements;
   said at least one female work mat aligning opposite said at least one male work mat with said at least one female inner edge opposing said at least one male inner edge;
   at least one connecting means of corresponding size and shape disposed in said first female side edge conduit and said corresponding first male side edge conduit, and at least one connecting means of corresponding size and shape disposed in said second female side edge conduit and said corresponding male second side edge conduit for cooperative engagement of said at least one female inner edge and said at least one male inner edge;

said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;

a web comprising at least two spaced apart vertical walls spaced apart from said end wall for providing compression and lateral support;

said edge border including longitudinal border support members inserting into a longitudinal passage between said spaced apart vertical walls of said edge border to provide structural strength thereto and minimize compression under load;

said base extending pass said end wall forming a border base flange, whereby said end wall of said edge border abuts a side edge of said platform and said border base flange supports a bottom edge of said platform above a top surface of said floor; and said multi-layer platform having a top surface and a bottom surface, further comprising a non-compressible wood base bottom layer, a limited compression layer having compression deflection or resistance typically less than 10 pounds per square inch, and said top surface including friction enhancing means selected from the group consisting of a raised pattern, a plurality of knots, a plurality of bumps, a plurality of ridges, a plurality of dimples, a plurality of grooves, a plurality of pits, a plurality of inverted dimples, a recessed area, a rubber material, a neoprene material, a vinyl chloride material, a styrene butadiene rubber ("SBR") material, a nonslip coating composition, a textured material, a granular material, an electro-static dissipative coating, and combinations thereof.

20. The modular multi-layer platform of claim 19, wherein said top surface of said edge border is selected from the group consisting of an irregular pattern, a stamped pattern, a grooved pattern, and combinations thereof.

21. The modular multi-layer platform of claim 19, including a spacer disposed on a top surface of said border base flange supporting said platform above a top surface of said floor.

22. The modular multi-layer platform of claim 19, further comprising an L-connector spaced apart and aligned with a horizontal medial slot in said at least one female work mat cooperatively engaging an inner side edge thereof.

23. The modular multi-layer platform of claim 22, wherein said L-connector includes a distal end flush with a inner edge.

24. The modular multi-layer platform of claim 19, said connecting means including a first expandable work platform mat section including a first inner edge joined to a second inner edge of a second expandable work platform section with an elongated T-connector comprising an upward extending central flange extending upward from a base flange forming a first base flange portion and a second base flange portion, said first base flange portion cooperatively engaging a first horizontal slot formed in said first inner edge of said first expandable work platform mat section in a tongue and groove arrangement and said second base flange portion cooperatively engaging a second horizontal slot formed in said second inner edge of second expandable work platform mat section in a tongue and groove arrangement for aligning and holding said first expandable work platform mat section to said second expandable work platform section.

25. The modular multi-layer platform of claim 19, wherein said connecting means comprises a dowel.

26. The modular multi-ply platform of claim 19 further comprises a bottom layer having a wood or wood composite base, and at least one layer comprising a limited compression layer.

27. The modular multi-ply platform of claim 26, wherein said limited compression layer is selected from the group consisting of an open cell foam, a closed cell foam material, a polyurethane, a neoprene, a vinyl composite and combinations thereof.

28. The modular multi-ply platform of claim 26, wherein said limited compression layer has a compression force deflection to ASTM D 3574-08 of up to 100 psi.

29. The modular multi-ply platform of claim 26, wherein said limited compression layer have a compression force deflection to ASTM D 3574-08 in a range of from between 5 to 75 psi.

30. The modular multi-ply platform of claim 26, wherein said limited compression layer have a compression set of from 25 to 40 percent.

31. A modular multi-layer platform comprising:

at least one female work mat section comprising a first multi-layer platform having a top surface, a bottom surface, and at least one female inner edge;

at least one male work mat section comprising a first multi-layer platform having a top surface, a bottom surface, and at least one male inner edge;

said at least one female work mat including a first female side edge border parallel and spaced apart from a second female side edge border connected by a female end edge border, each one having a chamfered edge including at least one conduit extending along a longitudinal side edge comprising spaced apart web elements;

said at least one male work mat including a first male side edge border parallel and spaced apart from a second male side edge border connected by a male end edge border, each one having a chamfered edge including at least one conduit extending along a longitudinal side edge comprising spaced apart web elements;

said at least one female work mat aligning opposite said at least one male work mat with said at least one female inner edge opposing said at least one male inner edge;

at least one connecting means of corresponding size and shape disposed in said first female side edge conduit and said corresponding first male side edge conduit, and at least one connecting means of corresponding size and shape disposed in said second female side edge conduit and said corresponding male second side edge conduit for cooperative engagement of said at least one female inner edge and said at least one male inner edge;

a base of said border extends pass said end wall forming a border base flange, whereby said end wall of said edge border abuts a side edge of said platform and said border base flange supports a bottom edge of said platform;

said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;
including a selected number of expander work mat sections each one comprising at least one expander work mat section comprising a first multi-layer platform having a top surface, a bottom surface, and an expander female inner edge and an expander male inner edge;
said at least one expander work mat including a first expander side edge border parallel spaced apart from a second expander side edge border, each one having a chamfered edge including at least one conduit extending along a longitudinal side edge comprising spaced apart web elements;
said at least one expander work mat including a first expander side edge border parallel and spaced apart from a second expander side edge border connected by an expander end edge border, each one having a chamfered edge including at least one conduit extending along a longitudinal side edge comprising spaced apart web elements;
said expander female inner edge aligning opposite of said inner edge of said at least one male work mat and said expander male inner edge aligning opposite of said inner edge of at least one female inner edge;
at least one connecting means of corresponding size and shape disposed in said first female side edge conduit and said corresponding first expander side edge conduit, and at least one connecting means of corresponding size and shape disposed in said male side edge conduit and said corresponding expander second side edge conduit for cooperative engagement of said at least one female work mat with said expander work mat and said at least one male work mat;
said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;
said web comprises at least two spaced apart vertical walls spaced apart from said end wall for providing compression and lateral support;
said base of said border extends pass said end wall forming a border base flange, whereby said end wall of said edge border abuts a side edge of said platform and said border base flange supports a bottom edge of said platform;
a longitudinal border support member inserting into a longitudinal passage between said spaced apart vertical walls of said edge border to provide structural strength thereto and minimize compression under load;
an L-connector spaced apart and aligned with a horizontal medial slot in said at least one female work mat cooperatively engaging an inner side edge thereof flush with said female end edge border; and
said multi-layer platform having a top surface and a bottom surface, further comprising a non-compressible wood base bottom layer covered by a limited compression layer having compression deflection or resistance typically less than 10 pounds per square inch, and said top surface including friction enhancing means selected from the group consisting of a raised pattern, a plurality of knots, a plurality of bumps, a plurality of ridges, a plurality of dimples, a plurality of grooves, a plurality of pits, a plurality of inverted dimples, a recessed area, a rubber material, a neoprene material, a vinyl chloride material, a styrene butadiene rubber ("SBR") material, a nonslip coating composition, a textured material, a granular material, an electro-static dissipative coating, and combinations thereof.

32. The modular multi-layer platform of claim 31 wherein said borders comprise elastomeric synthetic material.

33. The modular multi-layer platform of claim 31 wherein at least a top surface of said multi-layer platforms is covered with a covering selected from the group consisting of smooth, textured, granular, and electrostatically dissipative coatings.

34. The modular multi-layer platform of claim 31, wherein said top surface of said edge border is selected from the group consisting of an irregular pattern, a stamped pattern, a grooved pattern, and combinations thereof.

35. The modular multi-ply platform of claim 31 further comprises a bottom layer having a wood or wood composite base, and at least one layer comprising a limited compression layer.

36. The modular multi-ply platform of claim 35, wherein said limited compression layer is selected from the group consisting of an open cell foam, a closed cell foam material, a polyurethane, a neoprene, a vinyl composite and combinations thereof.

37. The modular multi-ply platform of claim 35, wherein said limited compression layer have a compression force deflection to ASTM D 3574-08 in a range of from between 5 to 75 psi.

38. The modular multi-ply platform of claim 35, wherein said limited compression layer have a compression set of from 25 to 40 percent.

39. A modular multi-layer platform comprising:
at least one female work mat section comprising a first multi-layer platform having a top surface, a bottom surface, and at least one female inner edge;
at least one male work mat section comprising a first multi-layer platform having a top surface, a bottom surface, and at least one male inner edge;
said at least one female work mat including a first female side edge border parallel and spaced apart from a second female side edge border connected by a female end edge border, each one having a chamfered edge including at least one conduit extending along a longitudinal side edge comprising spaced apart web elements;
said at least one male work mat including a first male side edge border parallel and spaced apart from a second male side edge border connected by a male end edge border, each one having a chamfered edge including at least one conduit extending along a longitudinal side edge comprising spaced apart web elements;
said at least one female work mat aligning opposite said at least one male work mat with said at least one female inner edge opposing said at least one male inner edge;
at least one connecting means of corresponding size and shape disposed in said first female side edge conduit and said corresponding first male side edge conduit, and at least one connecting means of corresponding size and shape disposed in said second female side edge conduit and said corresponding male second side edge conduit for cooperative engagement of said at least one female inner edge and said at least one male inner edge;
a base of said border extends pass said end wall forming a border base flange, whereby said end wall of said edge border abuts a side edge of said platform and said border base flange supports a bottom edge of said platform;

said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;

a selected number of expander work mat sections each one comprising at least one expander work mat section comprising a first multi-layer platform having a top surface, a bottom surface, and an expander female inner edge and an expander male inner edge;

said at least one expander work mat including a first expander side edge border parallel spaced apart from a second expander side edge border, each one having a chamfered edge including at least one conduit extending along a longitudinal side edge comprising spaced apart web elements;

said at least one expander work mat including a first expander side edge border parallel and spaced apart from a second expander side edge border connected by an expander end edge border, each one having a chamfered edge including at least one conduit extending along a longitudinal side edge comprising spaced apart web elements;

said expander female inner edge aligning opposite of said inner edge of said at least one male work mat and said expander male inner edge aligning opposite of said inner edge of at least one female inner edge;

at least one connecting means of corresponding size and shape disposed in said first female side edge conduit and said corresponding first expander side edge conduit, and at least one connecting means of corresponding size and shape disposed in said male side edge conduit and said corresponding expander second side edge conduit for cooperative engagement of said at least one female work mat with said expander work mat and said at least one male work mat;

said chamfered edge of said edge border comprises a longitudinal member having a flat base connecting to an end wall, and a top load supporting surface integrally joining said base and said an end wall at an acute angle forming an inclined plane extending upward from a tip formed by a junction with said base and said top or said end wall providing a generally seamless transition from said edge border to a top surface of said platform section;

said web comprises at least two spaced apart vertical walls spaced apart from said end wall for providing compression and lateral support;

said base of said border extends pass said end wall forming a border base flange, whereby said end wall of said edge border abuts a side edge of said platform and said border base flange supports a bottom edge of said platform;

a longitudinal border support member inserting into a longitudinal passage between said spaced apart vertical walls of said edge border to provide structural strength thereto and minimize compression under load;

said connecting means including a first expandable work platform mat section including a first inner edge joined to a second inner edge of a second expandable work platform section with +an elongated T-connector comprising an upward extending central flange extending upward from a base flange forming a first base flange portion and a second base flange portion, said first base flange portion cooperatively engaging a first horizontal slot formed in said first inner edge of said first expandable work platform mat section in a tongue and groove arrangement and said second base flange portion cooperatively engaging a second horizontal slot formed in said second inner edge of said second expandable work platform mat section in a tongue and groove arrangement for aligning and holding said first expandable work platform mat section to said second expandable work platform section and said multi-layer platform having a top surface and a bottom surface, further comprising a non-compressible wood base bottom layer covered by a limited compression layer having compression deflection or resistance typically less than 10 pounds per square inch, and said top surface including friction enhancing means selected from the group consisting of a raised pattern, a plurality of knots, a plurality of bumps, a plurality of ridges, a plurality of dimples, a plurality of grooves, a plurality of pits, a plurality of inverted dimples, a recessed area, a rubber material, a neoprene material, a vinyl chloride material, a styrene butadiene rubber ("SBR") material, a nonslip coating composition, a textured material, a granular material, an electro-static dissipative coating, and combinations thereof.

40. The modular multi-layer platform of claim 39 wherein said borders comprise elastomeric synthetic material.

41. The modular multi-layer platform of claim 39 wherein at least said top surface is covered with a covering selected from the group consisting of smooth, textured, granular, and electrostatically dissipative coatings.

42. The modular multi-layer platform of claim 39, wherein said top surface of said edge border is selected from the group consisting of an irregular pattern, a stamped pattern, a grooved pattern, and combinations thereof.

43. The modular multi-ply platform of claim 39 further comprises a bottom layer having a wood or wood composite base, and at least one layer comprising a limited compression layer.

44. The modular multi-ply platform of claim 43, wherein said limited compression layer is selected from the group consisting of an open cell foam, a closed cell foam material, a polyurethane, a neoprene, a vinyl composite and combinations thereof.

45. The modular multi-ply platform of claim 43, wherein said limited compression layer have a compression force deflection to ASTM D 3574-08 of up to 100 psi.

46. The modular multi-ply platform of claim 43, wherein said limited compression layer have a compression force deflection to ASTM D 3574-08 in a range of from between 5 to 75 psi.

47. The modular multi-ply platform of claim 43, wherein said limited compression layer have a compression set of from 25 to 40 percent.

* * * * *